United States Patent
Dunlap, III et al.

(10) Patent No.: US 12,151,772 B2
(45) Date of Patent: Nov. 26, 2024

(54) BICYCLE SUSPENSION COMPONENTS

(71) Applicant: SRAM, LLC, Chicago, IL (US)

(72) Inventors: Charles Dunlap, III, Manitou Springs, CO (US); Kevin Wesling, Lombard, IL (US)

(73) Assignee: SRAM, LLC, Chicago, IL (US)

(*) Notice: Subject to any disclaimer, the term of this patent is extended or adjusted under 35 U.S.C. 154(b) by 96 days.

(21) Appl. No.: 17/357,125

(22) Filed: Jun. 24, 2021

(65) Prior Publication Data

US 2022/0411008 A1    Dec. 29, 2022

(51) Int. Cl.
*B62K 25/08* (2006.01)
*F16F 9/02* (2006.01)

(52) U.S. Cl.
CPC .......... *B62K 25/08* (2013.01); *F16F 9/0218* (2013.01); *B62K 2201/04* (2013.01); *B62K 2201/08* (2013.01)

(58) Field of Classification Search
CPC ............... B62K 25/08; B62K 2201/04; B62K 2201/08; F16F 9/0218
See application file for complete search history.

(56) References Cited

U.S. PATENT DOCUMENTS

| | | | |
|---|---|---|---|
| 1,200,446 A | 10/1916 | Funk | |
| 2,212,759 A | 8/1940 | Tea | |
| 4,433,759 A | 2/1984 | Ichinose | |
| 4,791,712 A | 12/1988 | Wells et al. | |
| 5,195,766 A | 3/1993 | Dohrmann et al. | |
| 5,367,918 A | 11/1994 | Chang | |
| 5,628,388 A | 5/1997 | Angermann | |
| 5,649,693 A | 7/1997 | Busby et al. | |
| 6,217,049 B1 | 4/2001 | Becker | |
| 6,343,807 B1 | 2/2002 | Rathbun | |
| 6,505,719 B2 | 1/2003 | Gonzalez et al. | |
| 6,651,787 B2 | 11/2003 | Grundei | |
| 7,201,260 B2 | 4/2007 | Diederich et al. | |
| 9,132,881 B2 | 9/2015 | Kwaterski | |
| 9,452,651 B2 | 9/2016 | Toyota | |

(Continued)

FOREIGN PATENT DOCUMENTS

| | | | |
|---|---|---|---|
| BE | 425983 A | 2/1938 | |
| CH | 289869 A | 3/1953 | |

(Continued)

OTHER PUBLICATIONS

OREDY Shocks Struts 2PCS Front Struts Coil Spring Suspension Struts Assembly, Web Page, https://www.metalpartmaker.com/index.php?route=product/product&product_id=24036, Last Checked Feb. 23, 2022.

(Continued)

*Primary Examiner* — Tony H Winner

(57) ABSTRACT

Example bicycle suspension components are described herein. An example suspension component includes an air spring including an air spring body and a piston in the air spring body. The piston divides the air spring body into a first chamber and a second chamber. The air spring also includes a shaft extending into the air spring body. The shaft extends through the piston. The piston is slidable along the shaft. The air spring further includes a spring to bias the piston in a first direction relative to the shaft.

13 Claims, 11 Drawing Sheets

(56) References Cited

U.S. PATENT DOCUMENTS

| | | | |
|---|---|---|---|
| 9,630,679 B2 | 4/2017 | Aoki | |
| 9,988,124 B2 | 6/2018 | Kwaterski | |
| 10,099,743 B2 | 10/2018 | Walthert et al. | |
| 10,166,832 B2 | 1/2019 | DeBruler | |
| 10,703,158 B2 | 7/2020 | Pielock et al. | |
| 10,731,724 B2 | 8/2020 | Laird | |
| 10,933,940 B2 | 3/2021 | Walthert et al. | |
| 2002/0195755 A1 | 12/2002 | Hoose | |
| 2003/0051957 A1 | 3/2003 | Lemieux | |
| 2007/0119671 A1 | 5/2007 | Quinn et al. | |
| 2008/0041681 A1* | 2/2008 | Shipman | B62K 25/08 280/276 |
| 2010/0117322 A1 | 5/2010 | Achenbach | |
| 2012/0068436 A1* | 3/2012 | Powell | F16F 9/56 280/283 |
| 2012/0187651 A1* | 7/2012 | Wimmer | B62K 25/08 280/276 |
| 2013/0313803 A1 | 11/2013 | Kwaterski | |
| 2015/0054253 A1 | 2/2015 | Pye | |
| 2015/0091271 A1 | 4/2015 | Ikeda | |
| 2015/0344101 A1 | 12/2015 | Kwaterski | |
| 2016/0040741 A1 | 2/2016 | Laird | |
| 2017/0106938 A1* | 4/2017 | Pelot | F16F 9/06 |
| 2017/0167563 A1 | 6/2017 | Galasso | |
| 2017/0334504 A1 | 11/2017 | Pye et al. | |
| 2018/0313423 A1 | 11/2018 | Laird | |
| 2018/0334219 A1 | 11/2018 | Walthert et al. | |
| 2019/0054973 A1 | 2/2019 | Barefoot | |
| 2019/0145483 A1 | 5/2019 | Laird et al. | |
| 2020/0094910 A1* | 3/2020 | Weagle | F16F 9/061 |
| 2020/0256420 A1 | 8/2020 | Mallin | |
| 2021/0010556 A1* | 1/2021 | Laird | B62K 25/08 |
| 2022/0252126 A1 | 8/2022 | Matsumoto | |
| 2022/0364626 A1 | 11/2022 | Leclercq | |
| 2023/0055754 A1 | 2/2023 | Kim | |

FOREIGN PATENT DOCUMENTS

| | | |
|---|---|---|
| CN | 1784337 A | 6/2006 |
| CN | 104648585 A | 5/2015 |
| CN | 109572905 A | 4/2019 |
| CN | 209705168 U | 11/2019 |
| CN | 111043221 A | 4/2020 |
| DE | 1264165 B | 3/1968 |
| DE | 1292018 B | 4/1969 |
| DE | 1937147 A1 | 2/1971 |
| DE | 1780447 B1 | 3/1972 |
| DE | 2504202 A1 | 8/1975 |
| DE | 3301707 A1 | 7/1984 |
| DE | 3600845 A1 | 8/1986 |
| DE | 4032398 A1 | 4/1991 |
| DE | 4212079 A1 | 10/1993 |
| DE | 29920363 U1 | 2/2000 |
| DE | 20100117 U1 | 4/2001 |
| DE | 20219730 U1 | 3/2003 |
| DE | 10229287 A1 | 1/2004 |
| DE | 202004013640 U1 | 11/2004 |
| DE | 102012012902 A1 | 1/2013 |
| DE | 102013109342 A1 | 3/2015 |
| DE | 102015115678 A1 | 3/2017 |
| DE | 102015219168 A1 | 4/2017 |
| DE | 102017207523 B3 | 9/2018 |
| EP | 3403910 A1 | 11/2018 |
| GB | 191029850 A | 10/1911 |
| GB | 104022 A | 2/1917 |
| GB | F 116153 A | 6/1918 |
| GB | 155973 A | 1/1921 |
| GB | 408592 A | 4/1934 |
| GB | 693660 A | 7/1953 |
| GB | 752284 A | 7/1956 |
| GB | 899650 B | 6/1962 |
| JP | 526263 A | 1/1977 |
| JP | 5315967 A | 2/1978 |
| JP | 5753139 U | 3/1982 |
| JP | 604478 A | 1/1985 |
| JP | 6322781 A | 1/1988 |
| JP | 0335334 U | 4/1991 |
| JP | 069995 B2 | 2/1994 |
| JP | 069996 B2 | 2/1994 |
| JP | 0649507 Y2 | 12/1994 |
| JP | 0791475 A | 4/1995 |
| JP | 0774024 B2 | 8/1995 |
| JP | 08300928 A | 11/1996 |
| JP | 09119466 A | 5/1997 |
| JP | 2000009168 A | 1/2000 |
| JP | 2001241506 A | 9/2001 |
| JP | 2002130354 A | 5/2002 |
| JP | 2003014025 A | 1/2003 |
| JP | 2005180615 A | 7/2005 |
| JP | 2006090381 A | 4/2006 |
| JP | 2008045604 A | 2/2008 |
| JP | 2009108916 A | 5/2009 |
| JP | 2009264500 A | 11/2009 |
| JP | 2011163550 A | 8/2011 |
| JP | 2012092945 A | 5/2012 |
| JP | 2017180683 A | 10/2017 |
| TW | 200942443 | 10/2009 |
| TW | 201004834 | 2/2010 |
| TW | 201228873 | 7/2012 |
| TW | 201241336 A | 10/2012 |
| TW | 201520120 | 6/2015 |
| TW | 1657956 B | 5/2019 |
| TW | 202015959 | 5/2020 |
| WO | 2006095032 A1 | 9/2006 |
| WO | 2012075236 A1 | 6/2012 |
| WO | 2014009019 A1 | 1/2014 |
| WO | 2015028510 A1 | 3/2015 |

OTHER PUBLICATIONS

King Shocks 2005+ Ford F-250/F-350 4WD Front 2.5 Dia Remote Reservoir Shock (Pair), Web Page, https://mbenzgram.com/products/king-shocks-2005-ford-f-250-f-350-4wd-front-2-5-dia-remote-reservoir-shock-pair?variant=37411716759707&currency=USD&utm_medium=product_sync&utm_source=google&utm_content=sag_organic&utm_campaign=sag_organic&gclid=EAlaIQobChMIsMqa6MqW9gIV6BIMCh0Mtg_uEAQYBCABEgJFKvD_BWE Last Checked Feb. 23, 2022.

Performance Series 2.0 Smooth Body IFP Shock, Web Page, https://www.ridefox.com/product.php?m=truck&t=shocks&partnumber=985-24-124&make=Toyota&model=Land+Cruiser&year=2021&position=Rear, Last Checked Feb. 23, 2022.

Coilover Spring Rates for Toyota Tacoma & 4 Runner; Website: https://accutuneoffroad.com/shock_selection/; Mar. 28, 2019, last checked Jul. 3, 2023.

Mike Kazimer, Review: RockShox' New Flight Attendant Suspension System; Website: https://www.pinkbike.com/news.review-rockshox-flight-attendant.html; Oct. 5, 2021, last checked Feb. 23, 2022.

Adam Steinke; First Look: A new revolutionary suspension system by Corratec ?; Website: https://enduro-mtb.com/en/first-look-a-new-revolutionary-suspension-system-by-corratec/; Mar. 5, 2014, last checked Jul. 3, 2023.

* cited by examiner

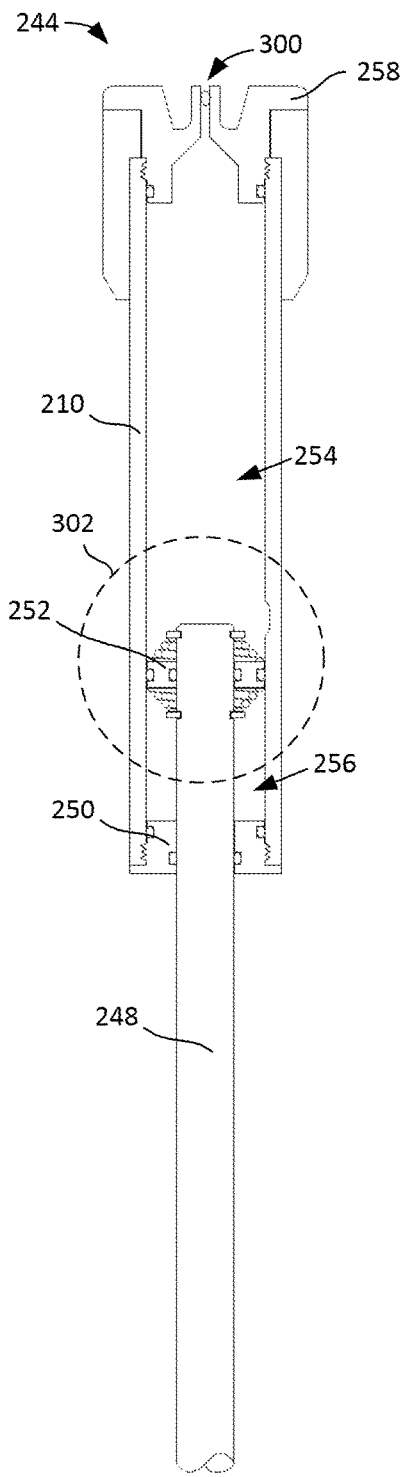
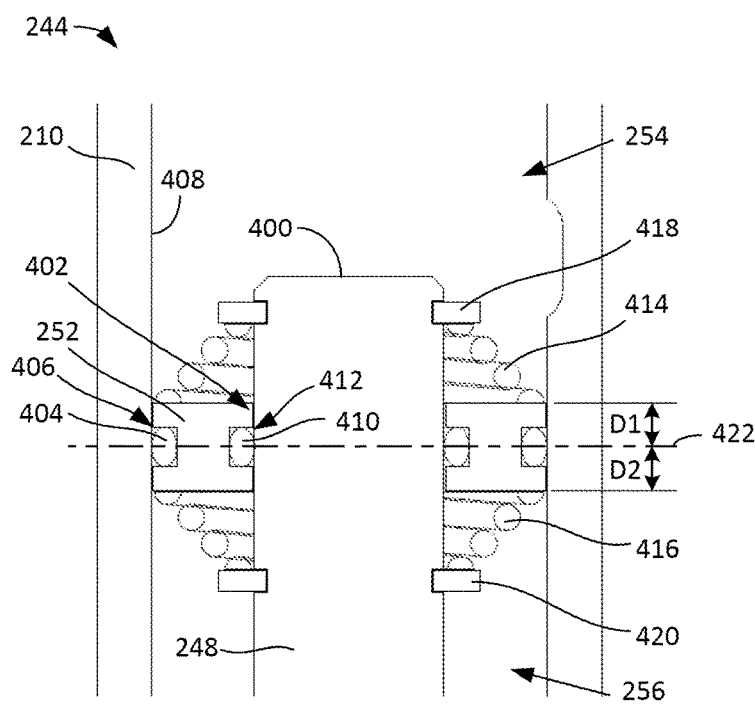
FIG. 3
FIG. 4

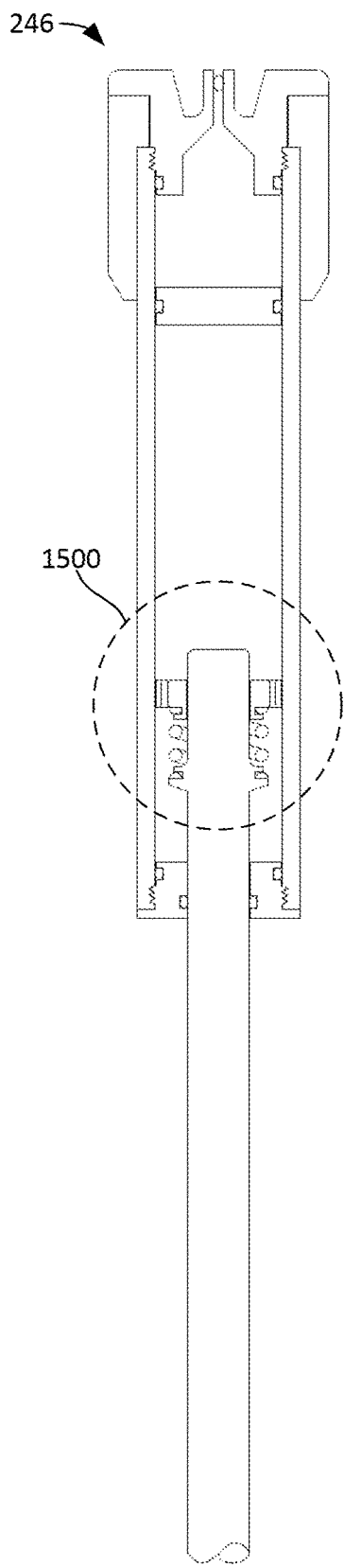
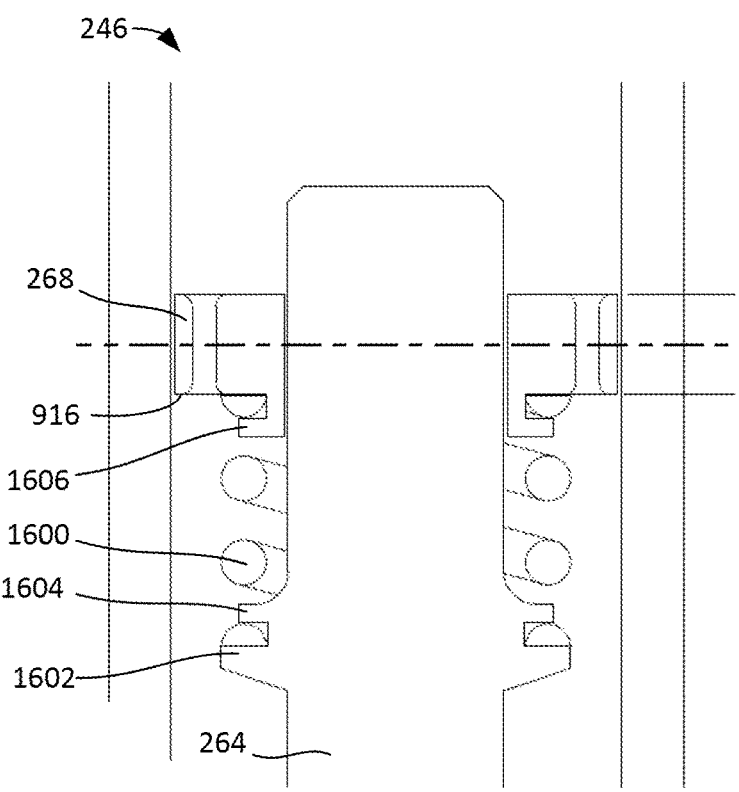
FIG. 15
FIG. 16

BICYCLE SUSPENSION COMPONENTS

FIELD OF THE DISCLOSURE

This disclosure relates generally to bicycle components and, more specifically, to bicycle suspension components.

BACKGROUND

Bicycles are known to have suspension components. Suspension components are used for various applications, such as cushioning impacts, vibrations, or other disturbances experienced by the bicycle during use as well as maintaining ground contact for traction. A common application for suspension components on bicycles is cushioning impacts or vibrations experienced by the rider when the bicycle is ridden over bumps, ruts, rocks, potholes, and/or other obstacles. These suspension components include rear and/or front wheel suspension components. Suspension components may also be used in other locations, such as a seat post or handlebar, to insulate the rider from impacts.

SUMMARY

An example suspension component for a bicycle disclosed herein includes an air spring including an air spring body and a piston in the air spring body. The piston divides the air spring body into a first chamber and a second chamber. The air spring also includes a shaft extending into the air spring body. The shaft extends through the piston. The piston is slidable along the shaft. The air spring further includes a spring to bias the piston in a first direction relative to the shaft.

An example suspension component for a bicycle disclosed herein includes a damper including a damper body and a damper member in the damper body. The damper member divides the damper body into a first chamber and a second chamber. The damper also includes a shaft extending into the damper body. The shaft extends through the damper member. The damper member is slidable along the shaft. The damper further includes a spring to bias the damper member in a first direction relative to the shaft.

A suspension component for a bicycle disclosed herein includes a first upper tube and a first lower tube configured in a telescopic arrangement and a second upper tube and a second lower tube configured in a telescopic arrangement. The first upper tube is coupled to the second upper tube. The suspension component also includes a damper in an interior space defined by the first upper and lower tubes. The damper includes a first shaft coupled to the first lower tube and a damper member movably coupled to the first shaft. The suspension component further includes an air spring in an interior space defined by the second upper and lower tubes. The air spring includes a second shaft coupled to the second lower tube and a piston movably coupled to the second shaft.

BRIEF DESCRIPTION OF THE DRAWINGS

FIG. 3 is a cross-sectional view of an example air spring that can be implemented in the example front fork of FIG. 2 on the example bicycle.

FIG. 4 is an enlarged view of the callout in FIG. 3 showing an example piston movably coupled to an example shaft by a dual-spring configuration.

FIG. 15 is a cross-sectional view of an example damper that can be implemented in the example front fork of FIG. 2.

FIG. 16 is an enlarged view of the callout of FIG. 15 showing an example damper member movably coupled to an example shaft by a single-spring configuration.

The figures are not to scale. Instead, the thickness of the layers or regions may be enlarged in the drawings. In general, the same reference numbers will be used throughout the drawing(s) and accompanying written description to refer to the same or like parts.

Figure 1:
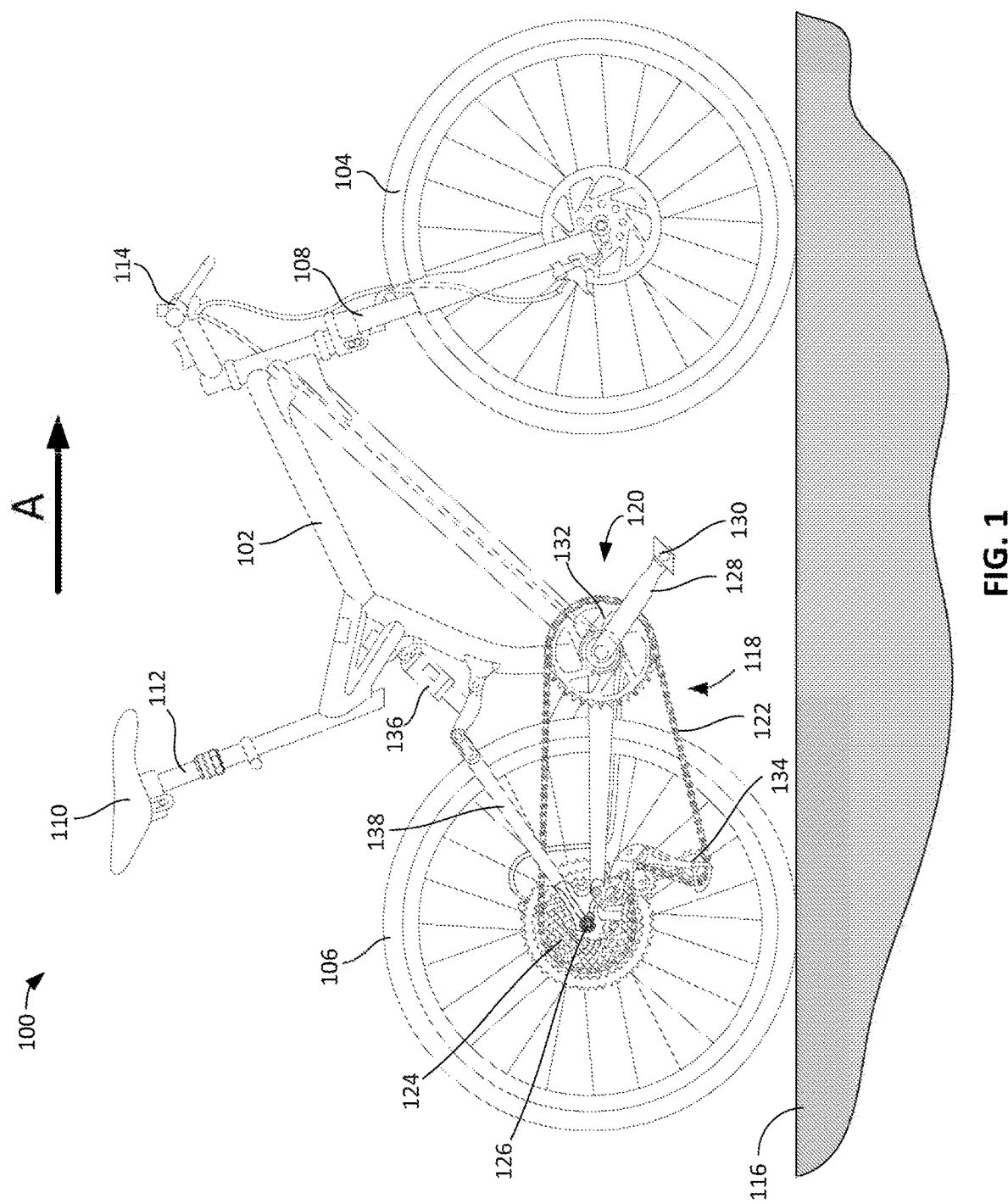
FIG. 1 is a side view of an example bicycle that can employ example suspension components disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example suspension components that can be implemented on a vehicle, such as a bicycle. An example suspension component disclosed herein is a front fork that connects the frame to the front wheel. The front fork may have first and second legs formed by first and second upper leg portions (tubes) that are telescopically arranged with respective first and second lower leg portions. The first and second upper leg portions are coupled to the frame and the first and second lower leg portions are coupled to the front wheel. The front fork may have a damper and a spring, such as an air spring, that act in conjunction to absorb shock impulses. The damper can be arranged in the first upper and lower leg portions of the first leg, and the air spring can be arranged in the second upper and lower leg portions of the second leg.

In known front forks, the damper and the spring require a certain breakaway force before the upper and lower leg portions begin to move relative to each other. In particular, the damper and air spring may include pistons with seals that require a certain amount of force to overcome the static friction before the leg portions can move relative to each other. Also, in the air spring, there may be a small force imbalance between the negative air chamber and the position air chamber, which results in a pressure platform adding to the breakaway force at a top-out position. Further, every time the direction of movement changes (e.g., expansion to compression), this static friction needs to be overcome. As such, there is a slight delay while the force builds up before the upper and lower leg portions begin to move. This results in a stick slip feel that can be felt by the rider at the handlebars. Further, high frequency (e.g., frequencies above 5 hertz (Hz)), lower amplitude vibrations, such as those caused by a washboard terrain, are typically not absorbed by the damper and spring. Instead, these high frequency vibrations are transmitted through the front fork to the frame and, thus, can be felt by the rider. Some riders attempt to remedy this effect by reducing the pressure in their tires. However, this can be unsafe, because the tires may sway from the rims and cause the rider to lose control. Further, reducing the tire pressure increases the likelihood of getting a pinch flat (where the edges of the rim puncture the tire), increases resistance, and increases pedaling effort.

Disclosed herein are example dampers and example air springs that include moveable piston and shaft configurations. This enables relative movement of the upper and lower leg portions without having to overcome the friction in the seals of the damper and air spring components. The example moveable piston and shaft configurations disclosed herein can include one or more cushioning members between the pistons and the shafts. In some examples, the cushioning members are implemented as springs (e.g., metallic coil springs). In others examples, the cushioning members can be implemented as elastomeric members (e.g., rubber pads) or other types of cushioning members. Therefore, when riding over a bump, for example, the first and second lower leg portions can move upward relative to the first and second upper leg portions before the breakaway force is reached. As such, the example moveable piston and shaft configurations enable the front fork to more quickly absorb shocks and impulses. Further, the moveable piston and shaft configurations also absorb high frequency vibrations, such as frequencies above 5 Hz, that would otherwise be transmitted to the handlebars and felt by the rider. The example moveable piston and shaft configurations enable the lower leg portions (which are attached to the wheel) to flutter or vibrate independent of the upper leg portions, thereby reducing vibrations that are felt by the rider. Therefore, lower frequency vibrations are partially absorbed by the example moveable piston and shaft configurations until the breakaway force causes the damper and air spring to compress or expand, while high frequency vibrations are absorbed by the example moveable piston and shaft configurations. As such, the example moveable piston and shaft configurations disclosed herein reduce vibrations felt at the handlebars by the rider, which creates a more comfortable ride for the rider. Further, this increases rider confidence in the traction and grip at the wheels.

An example air spring disclosed herein includes an air spring body, a piston in the air spring body, and a shaft. The air spring body may correspond to an upper leg portion or tube of the front fork. The piston is in the air spring body and divides the air spring body into a first chamber (e.g., a positive air chamber) and a second chamber (e.g., a negative air chamber). The shaft is coupled to a lower leg portion and extends into the air spring body. Unlike known air springs, the shaft and the piston are movably coupled. As such, the piston and the shaft can move relative to each other. In some examples, the shaft extends through the piston, and the piston is slidable along the shaft (and vice versa). In some examples, one or more cushioning members, such as springs, are coupled between the shaft and the piston. For example, a first spring is disposed around the shaft and biases the piston in a first direction relative to the shaft (or, said another way, the spring biases the shaft in a second direction opposite the first direction relative to the piston). In some examples, a second spring is provided on the opposite side of the piston as the first spring. In other examples, only one spring is utilized. When a compressive force is applied to the front fork, for example, the lower leg portion with the shaft move upward relative to the upper leg portion, the shaft slides through the piston, one of the springs compresses, and the other spring expands. This enables the lower leg portion to move upward relative to the upper leg portion before the piston reaches the breakaway force and moves in the air spring body. Once the breakaway force is reached, the piston slides within the air spring body. Lower frequency vibrations are transmitted through the shaft to the piston until the breakaway force is reached and the air spring compress. In some examples, because the springs are disposed on opposite sides of the piston, the initiating force to move the lower leg portion relative to the upper leg portion is zero. When the compressive force is removed, the spring(s) bias(es) the lower leg portion back to the original position relative to the upper leg portion. The opposite reaction can occur during rebound. Therefore, the spring(s) act(s) as a spring in series with the air spring, thereby enabling relative movement between the upper and lower leg portions. The spring(s) also absorb(s) high frequency vibrations that would otherwise not be absorbed by the damper and/or the air spring.

An example damper disclosed herein can include a similar arrangement as the example air spring disclosed above. For example, the damper can include a damper body, a piston (sometimes referred to as a damper member) in the damper body, and a shaft. The piston is disposed in the damper body and divides the damper body into a first chamber and a second chamber. The piston can include one or more channels to enable fluid to flow across the piston between the first and second chambers. The shaft is coupled to a lower leg portion and extends into the damper body. The shaft and the piston are movably coupled. As such, the piston and the shaft can move relative to each other. In some examples, the shaft extends through the piston, and the piston is slidable along the shaft (and vice versa). In some examples, one or more cushioning members, such as springs, are coupled between the shaft and the piston. Thus, the damper functions in a similar manner to the air spring to enable relative movement between a lower leg portion and an upper leg portion. However, in other examples, only one of the air spring or the damper may include a piston that is movably coupled to a shaft.

Turning now to the figures, FIG. 1 illustrates one example of a human powered vehicle on which the example suspension components disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 110 coupled to the frame 102 (e.g., near the rear end of the frame 102 relative to the forward direction A) via a seat post 112. The bicycle 100 also includes handlebars 114 coupled to the frame 102 and the front fork 108 (e.g., near a forward end of the frame 102 relative to the forward direction A) for steering the bicycle 100. The bicycle 100 is shown on a riding surface 116. The riding surface 116 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 118 that includes a crank assembly 120. The crank assembly 120 is operatively coupled via a chain 122 to a sprocket assembly 124 mounted to a hub 126 of the rear wheel 106. The crank assembly 120 includes at least one, and typically two, crank arms 128 and pedals 130, along with at least one front sprocket, or chainring 132. A rear gear change device 134, such as a derailleur, is disposed at the rear wheel 106 to move the chain 122 through different sprockets of the sprocket assembly 124. Additionally or alternatively, the bicycle 100 may include a front gear change device to move the chain 122 through gears on the chainring 132.

The example bicycle 100 includes a suspension system having one or more suspension components. In this example, the front fork 108 is implemented as a front suspension component. The front fork 108 is or integrates a shock absorber that includes a spring and a damper, disclosed in further detail herein. Further, in the illustrated example, the bicycle 100 includes a rear suspension component 136, which is a shock absorber, referred to herein as the rear shock absorber 136. The rear shock absorber 136 is coupled between two portions of the frame 102, including a swing arm 138 coupled to the rear wheel 106. The front fork 108 and the rear shock absorber 136 absorb shocks and vibrations while riding the bicycle 100 (e.g., when riding over rough terrain). In other examples, the front fork 108 and/or the rear shock absorber 136 may be integrated into the bicycle 100 in other configurations or arrangements. Further, in other examples, the suspension system may employ only one suspension component (e.g., only the front fork 108) or more than two suspension components (e.g., an additional suspension component on the seat post 112) in addition to or as an alternative to the front fork 108 and rear shock absorber 136.

While the example bicycle 100 depicted in FIG. 1 is a type of mountain bicycle, the example suspension components disclosed herein can be implemented on other types of bicycles. For example, the disclosed suspension components may be used on road bicycles, as well as bicycles with mechanical (e.g., cable, hydraulic, pneumatic, etc.) and non-mechanical (e.g., wired, wireless) drive systems. The disclosed suspension components can also be implemented on other types of two-wheeled, three-wheeled, and four-wheeled human powered vehicles. Further, the example suspension components can be used on other types of vehicles, such as motorized vehicles (e.g., a motorcycle, a car, a truck, etc.).

Figure 2:
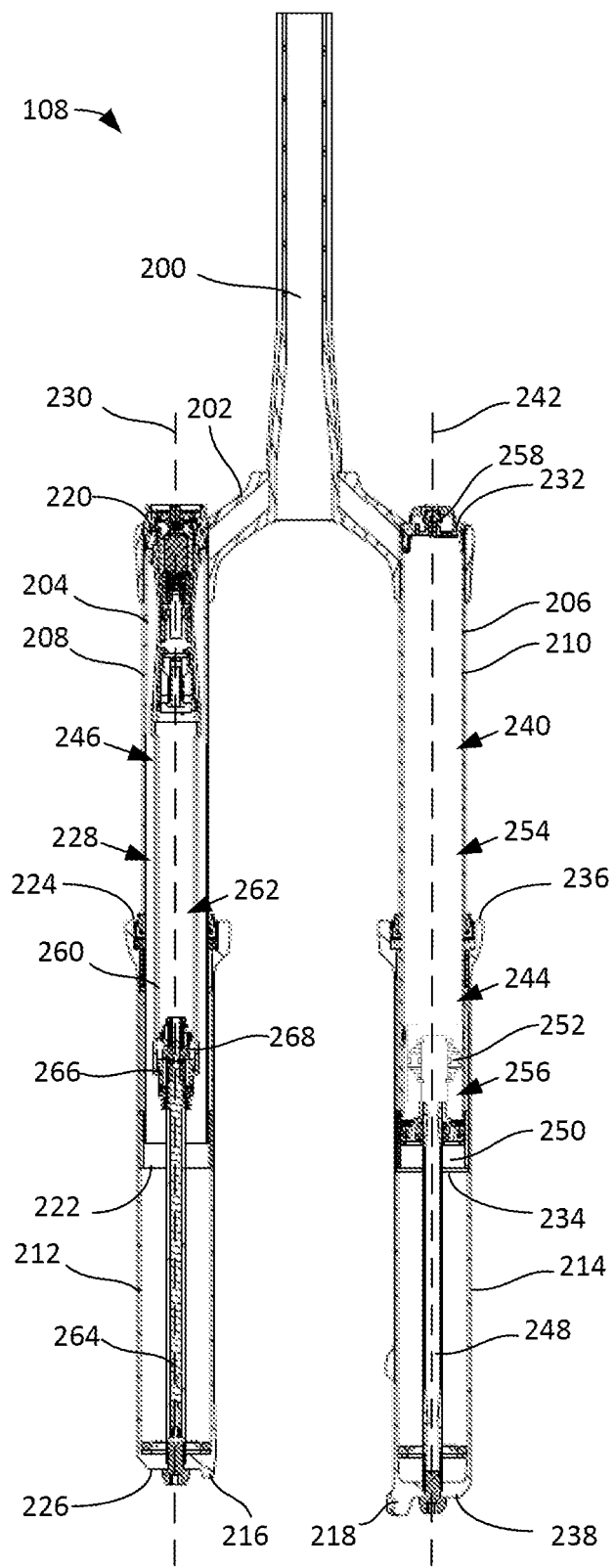
FIG. 2 is a cross-sectional view of an example front fork (a suspension component) that can be implemented on the example bicycle of FIG. 1.

FIG. 2 is a perspective view of the example front fork 108 (a suspension component) that may incorporate an example spring (e.g., an air spring) and/or an example damper disclosed herein. In the illustrated example of FIG. 2, the front fork 108 includes a steering tube 200, a crown 202, a first leg 204, and a second leg 206. In this example, the first and second legs 204, 206 include first and second upper tubes 208, 210 (sometimes referred to as leg portions or stanchions), respectively, and first and second lower tubes 212, 214 (sometimes referred to as leg portions or lowers), respectively. The first and second upper tubes 208, 210 may be collectively referred to as an upper tube assembly, and the first and second lower tubes 212, 214 may be collectively referred to as a lower tube assembly. The steering tube 200 couples to the frame 102 (FIG. 1) and the handlebars 114 (FIG. 1). The first and second upper tubes 208, 210 are coupled via the crown 202. In some examples, the first and second lower tubes 212, 214 are coupled via an arch (sometimes referred to as a fork brace or stabilizer). The first and second lower tubes 212, 214 include respective front wheel attachment portions 216, 218, such as holes (e.g., eyelets) or dropouts, for attaching the front wheel 104 (FIG. 1) to the front fork 108. The first and second upper tubes 208, 210 are slidably received within the respective first and second lower tubes 212, 214. Thus, the first and second upper tubes 208, 210 form a telescopic arrangement with the respective first and second lower tubes 212, 214. During a compression stroke, the first and second upper tubes 208, 210 move into or toward the respective first and second lower tubes 212, 214, and during a rebound stroke, the first and second upper tubes 208, 210 move out of or away from the respective first and second lower tubes 212, 214.

As shown in FIG. 2, the first upper tube 208 has a first end 220, referred to herein as a top end 220, and a second end 222, referred to herein as a bottom end 222, opposite the top end 220. The top end 220 is coupled to the crown 202. The first lower tube 212 has a first end 224, referred to herein as a top end 224, and a second end 226, referred to herein as a bottom end 226, opposite the top end 224. The bottom end 222 of the first upper tube 208 is disposed within the first lower tube 212. The top end 220 of the first upper tube 208 and the bottom end 226 of the first lower tube 212 form first and second distal ends of the suspension component. During compression, the top end 220 (the first distal end) and the bottom end 226 (the second distal end) are moved toward each other, and during extension or rebound, the top end 220 and the bottom end 226 are moved away from each other. Thus, the first upper and lower tubes 208, 212 form a telescopic arrangement and define an interior space 228. The first upper and lower tubes 208, 212 move along a first translation axis 230. The second upper and lower tubes 210, 214 are similarly arranged. In particular, the second upper tube 210 has a first end 232, referred to herein as a top end 232, and a second end 234, referred to herein as a bottom end 234, opposite the top end 232. The second lower tube 214 has a first end 236, referred to herein as a top end 236, and a second end 238, referred to herein as a bottom end 238, opposite the top end 236. The top end 232 of the second upper tube 210 is coupled to the crown 202, and the bottom end 238 of the second upper tube 210 is disposed within the second lower tube 214. Thus, the second upper and lower tubes 210 214 form a telescopic arrangement and define an interior space 240. The second upper and lower tubes 210, 214 move along a second translation axis 242.

In the illustrated example, the front fork 108 includes both a spring 244 and a damper 246. In this example, the spring 244 is implemented as an air spring, referred to herein as the air spring 244. The air spring 244 is disposed in and/or otherwise integrated into the second upper and lower tubes 210, 214, and the damper 246 is disposed in and/or otherwise integrated into the first upper and lower tubes 208, 212. More specifically, the air spring 244 is disposed within and/or otherwise defined by the interior space 240 of the second upper and lower tubes 210, 214 bounded by the walls of the second upper and lower tubes 210, 214. Similarly, the damper 246 is disposed within and/or otherwise defined by the interior space 228 formed by the walls of the first upper and lower tubes 208, 212. In other examples, the air spring 244 can be disposed in and/or otherwise integrated into the first upper and lower tubes 208, 212, and the damper 246 can be disposed in and/or otherwise integrated into the second upper and lower tubes 210, 214. The air spring 244 is configured to resist compression of the top ends 220, 232 toward the bottom ends 226, 238 and return the tubes 208, 210, 212, 214 to the extended position after compression occurs. The damper 246 is configured to limit the speed at which the compression/extension occurs and/or otherwise absorb vibrations.

The air spring 244 includes an air spring body that defines one or more pneumatic chambers. In this example, the second upper tube 210 is implemented as the air spring body. Therefore, the second upper tube 210 may also be referred to as the air spring body 210. However, in other examples, a separate air spring body may be disposed in the second upper tube 210. As shown in FIG. 2, the air spring 244 includes a first shaft 248 (which may also be referred to as a spring or piston shaft, rod, or stem). The first shaft 248 is coupled to and extends upward from the bottom end 238 of the second lower tube 214. The first shaft 248 extends into the second upper tube 210. In particular, the first shaft 248 extends through a seal 250 in the bottom end 234 of the second upper tube 210 and into the interior space 240 of the second upper tube 210. The air spring 244 includes a piston 252 in the second upper tube 210 (i.e., in the interior space 240 of the second upper tube 210). The piston 252 is movably coupled to the first shaft 248, as disclosed in further detail herein. The piston 252 is slidable within the second upper tube 210. In some examples, a seal is disposed around the piston 252, which creates a seal between the piston 252 and the inner surface of the second upper tube 210. The piston 252 divides the interior space 240 in the second upper tube 210 into a first chamber 254 and a second chamber 256 (which may also be referred to as pneumatic chambers). The first chamber 254 is formed between the piston 252 and a top barrier, such as a cap 258, in the top end 232 of the second upper tube 210. The second chamber 256 is formed between the piston 252 and the seal 250 in the bottom end 234 of the second upper tube 210.

In some examples, the first chamber 254 is filled with a mass of a pneumatic fluid (e.g., a gas, such as air) having a higher pressure than ambient pressure. Therefore, in this example, the first chamber 254 forms a pressurized chamber (sometimes referred to as a highly pressurized zone or positive spring chamber). In some examples, the second chamber 256 forms a negative spring chamber below the piston 252. When the front fork 108 compresses and the ends of the second upper and lower tubes 210, 214 move toward each other, such as when riding over a bump, the first shaft 248 moves the piston 252 toward the top end 232 of the second upper tube 210. As a result, the volume of the first chamber 254 decreases and, thus, the pressure of the fluid within the first chamber 254 increases. Conversely, the volume of the second chamber 256 increases and therefore the pressure of the fluid in the second chamber 256 decreases. After the compressive force is removed, the increased pressure in the first chamber 254 and the decreased pressure in the second chamber 256 acts to move the piston 252 away from the top end 232, which pushes the ends of the second upper and lower tubes 210, 214 away from each other, thereby acting as a spring to return the front fork 108 to its original or riding set up. The first upper and lower tubes 208, 212 similarly follow this motion.

In other examples, the air spring 244 can be implemented by a physical spring, such as a coil spring. For example, a coil spring can be disposed in the second upper tube 210 between the first shaft 248 and the top end 232 of the second upper tube 210. When the front fork 108 is compressed, the first shaft 248 is moved upward and compresses the coil spring. After the compression, the coil spring acts to expand the front fork 108 back to its original or riding set up. In other examples, the air spring 244 can be implemented by other types of fluid springs and/or physical spring configurations.

In the illustrated example, the damper 246 includes a damper body 260 defining a chamber 262. The damper body 260 is disposed in and coupled to the first upper tube 208. The chamber 262 is filled with fluid. The fluid may be, for example, oil, such as a mineral oil based damping fluid. In other examples, other types of damping fluids may be used (e.g., silicon or glycol type fluids). The damper 246 includes a second shaft 264 (which may be referred to as a damper or piston shaft, rod, or stem). The second shaft 264 is coupled to and extends upward from the bottom end 226 of the first lower tube 212. The second shaft 264 extends into the damper body 260. In particular, the second shaft 264 extends through a seal 266 in the bottom of the damper body 260 and into the chamber 262 of the damper body 260. The damper 246 includes a damper member 268 (which may also be referred to as a piston or mid-valve) disposed in the chamber 262 of the damper body 260. The damper member 268 is movably coupled to the second shaft 264, as disclosed in further detail herein. The damper member 268 is slidable in the damper body 260. The damper member 268 divides the chamber 262 into a first chamber and a second chamber (shown in further detail in connection with FIG. 8). In some examples, a seal (e.g., an o-ring) is disposed around the damper member 268 to prevent fluid leakage between the outside of the damper member 268 and the inner surface of the damper body 260. When the front fork 108 compresses and the ends of the first upper and lower tubes 208, 212 move toward each other, such as when riding over a bump, the second shaft 264 moves the damper member 268 upward in the chamber 262 toward the top end 220 of the first upper tube 208. During rebound, the damper member 268 moves downward in the chamber 262 away from the top end 220 of the first upper tube 208. The damper member 268 includes one or more channels that enable fluid to flow across the damper member 268, at a restricted rate, between the first and second chambers.

As disclosed above, the air spring 244 and the damper 246 include multiple seals (e.g., the seal between the piston 252 and the inner wall of the second upper tube 210, the seal 250, the seal between the damper member 268 and the inner wall of the damper body 260, the seal 266, etc.). These seals have a static friction that must be overcome to compress or expand the front fork 108. While relatively small, this static friction may cause a delay in the compression or rebound movement. For example, if a compressive force is applied to the front fork 108, the upper and lower tubes 208, 210, 212, 214 may remain in the same relationship (i.e., no movement) until the force builds enough to overcome the static friction.

Once the static friction is overcome, the components of the air spring 244 and the damper 246 move (e.g., slide), which enables the upper and lower tubes 208, 210, 212, 214 to move relative to each other. This delay may cause an undesirable stick slip feeling that can be felt by the rider. Additionally, high frequency vibrations (e.g., above 5 Hz) having a low amplitude may be not absorbed by the air spring 244 and the damper 246. Instead, these high frequency vibrations are transmitted through the front fork 108 to the handlebars 114 (FIG. 1) and are felt by the rider. To address the above-noted drawbacks, the air spring 244 and/or the damper 246 may incorporate pistons that are movable relative to their shafts, as disclosed in further detail herein.

FIG. 3 is a cross-sectional view of the example air spring 244 in an extended or unloaded state. The first shaft 248 extends through the seal 250 and into the second upper tube 210. The piston 252 is coupled to the first shaft 248. As shown in FIG. 3, the piston 252 divides the inside of the second upper tube 210 into the first chamber 254 (the positive air chamber) and the second chamber 256 (the negative air chamber). In some examples, the cap 258 includes an air fill port 300 for adding or removing air to/from the first chamber 254.

FIG. 4 is an enlarged view of the callout 302 of FIG. 3. The piston 252 is disposed near an end 400 of the first shaft 248. The piston 252 is movably coupled to the first shaft 248. This allows the first shaft 248 and the piston 252 to move relative to each other, which enables the second upper and lower tubes 210, 214 to move (compress or rebound) relative to each other. In the illustrated example, the first shaft 248 extends through the piston 252. In particular, the piston 252 has an opening 402 through which the first shaft 248 extends. The piston 252 is slidable along the first shaft 248, and the first shaft 248 is slidable through the piston 252. Thus, the first shaft 248 and the piston 252 can slide axially relative to each other. In this manner, the first shaft 248 and the piston 252 are movably coupled. In other examples the first shaft 248 and the piston 252 can be movably coupled in other configurations or arrangements. For example, the piston 252 may be disposed above or beyond the first shaft 248 and may be coupled to the first shaft 248 by a spring.

In the illustrated example, the air spring 244 includes an outer seal 404 disposed in an outer seal gland 406 formed in an outer peripheral edge of the piston 252. The outer seal 404 is to seal between the piston 252 and an inner surface 408 of the second upper tube 210. In the illustrated example, the air spring 244 also includes an inner seal 410 disposed in an inner seal gland 412 formed in an inner peripheral edge of the piston 252. The inner seal 410 is to seal between the piston 252 and the first shaft 248. Therefore, the piston 252 creates an airtight chamber in the first chamber 254 and the second chamber 256. In other examples, the air spring 244 may not include the outer seal 404 and/or the inner seal 410.

The air spring 244 can include one or more cushioning members to control relative movement of the first shaft 248 and the piston 252. In some examples, the cushioning members are implemented as springs. In the illustrated example, the air spring 244 includes a dual-spring configuration. For example, as illustrated in FIG. 4, the air spring 244 includes a first spring 414 disposed above the piston 252 and a second spring 416 disposed below the piston 252. Therefore, the second spring 416 is disposed on an opposite side of the piston 252 as the first spring 414. The first spring 414 biases the piston 252 in a first direction relative to the first shaft 248, and the second spring 416 biases the piston 252 in a second direction opposite the first direction relative to the first shaft 248. Said another way, the first spring 414 biases the first shaft 248 in a first direction relative to the piston 252, and the second spring 416 biases the first shaft 248 in a second direction opposite the first direction relative to the piston 252.

In the illustrated example, the air spring includes a first retainer 418 coupled to the first shaft 248 and a second retainer 420 coupled to the first shaft 248. The first spring 414 is disposed (e.g., axially constrained) between the first retainer 418 and the piston 252, and the second spring 416 is disposed (e.g., axially constrained) between the second retainer 420 and the piston 252. In some examples, the first and second retainers 418, 420 are circlips (sometimes referred to as C-clips, rotor clips, or snap rings). In some examples, the first spring 414 is fixedly coupled or attached to the first retainer 418 and/or the piston 252 (e.g., via welding, via fasteners, etc.). In other examples, the first spring 414 is not fixedly attached to the first retainer 418 or the piston 252, but merely compressed or sandwiched between the two parts. The second spring 416 can be similarly arranged between the second retainer 420 and the piston 252. In the illustrated example, the first and second springs 414, 416 are disposed around (e.g., are concentric or coaxial with) the first shaft 248. However, in other examples, the first and/or second springs 414, 416 can be disposed in other locations.

In some examples, the first and second springs 414, 416 are compression springs. As such, the first spring 414 biases the piston 252 downward relative to the first shaft 248, and the second spring 416 biases the piston 252 upward relative to the first shaft 248. In this example, the first and second springs 414, 416 are conical coil springs. In some examples, conical springs are advantageous because they have lower stress (because of longer wire length), less buckling (because of the increased width), and lower heights. Also, the increased width enables the first and second springs 414, 416 to contact the piston 252 near the outer edge of the piston 252, which increases stability. In other examples, the springs 414, 416 can be implemented as other types of coil springs and/or other types of springs (e.g., a leaf spring). Further, in other examples, the first and second springs 414, 416 can be implemented as tension springs.

In this example, the springs 414, 416 provide substantially the same biasing force. As such, in a rest state, the piston 252 is substantially centered between the first and second retainers 418, 420, as shown in FIG. 4. For example, a center line 422 is labeled in FIG. 4, which represents the center between the first and second retainers 418, 420. In this example, the piston 252 is centered along the center line 422 in the rest state or position. In particular, a distance D1 between a top of the piston 252 and the center line 422 is the same as a distance D2 between a bottom of the piston 252 and the center line 422. In other examples, the springs 414, 416 can be configured (e.g., by changing the length of the springs 414, 416 and/or the spring constants) such that the piston 252 is offset from the center line 422 in the rest state. In some examples, when the piston 252 is in the rest state, the first and/or second springs 414, 416 are in a compressed state. In other examples, the first and/or second springs 414, 416 may be in a relaxed state.

The moveable piston and shaft configuration and the springs 414, 416 enable relative movement between the second upper tube 210, which is attached to the frame 102 and considered the sprung mass, and the second lower tube 214, which is attached to the front wheel 104 and considered the unspring side of the suspension component. Therefore, the first shaft 248, the piston 252, and the springs 414, 416 control the movement of the second upper and lower tubes 210, 214 along the second translation axis 242 (FIG. 2).

Figure 5:
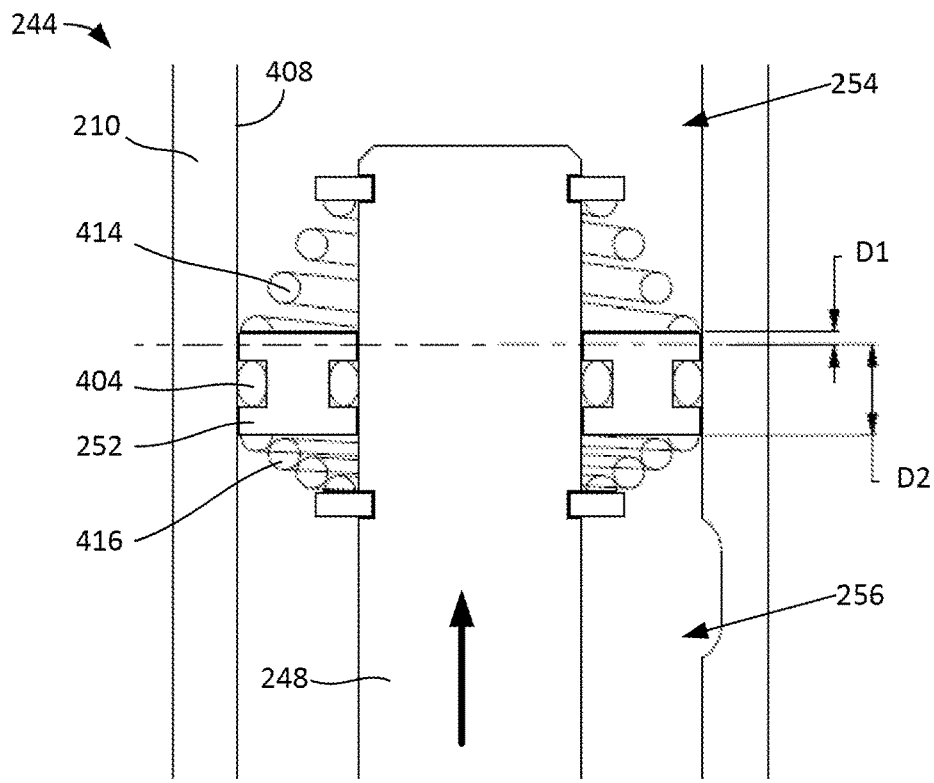
FIG. 5 shows the example shaft of FIG. 4 moved in a first direction relative to the example piston.

FIG. 5 shows the first shaft 248 being moved upward (e.g., a first direction) relative to the piston 252. This may occur when the air spring 244 experiences a compressive force, such as when riding over a bump. For example, when a compressive force is first applied to the front fork 108 (FIG. 2), the second lower tube 214 (FIG. 2) and the first shaft 248 are forced upward (as indicated by the arrow) relative to the second upper tube 210. A certain amount of friction exists between the piston 252 and the second upper tube 210 (at the interface between the outer seal 404 and the inner surface 408) that holds the piston 252 in place until breakaway (threshold) force is reached. During the initial compressive movement, the first shaft 248 moves upward relative the piston 252 (e.g., the first shaft 248 slides through the piston 252). This movement compresses the second spring 416 and expands the first spring 414. For example, as shown in FIG. 5, the distance D2 is greater than the distance D1. This configuration enables the second lower tube 214 (the unspring mass) to move upward relative to the second upper tube 210 before the breakaway force for the piston 252 is reached, thereby enabling the front fork 108 to absorb the vibrations more quickly during compression and improve responsiveness. Further, this results in a momentary reduced compression speed of the piston 252 relative to the first shaft 248, thus reducing the acceleration rate and therefore the momentary compression force acting on the air spring 244. If the compressive force is relatively small, such as when riding over a small bump, the piston 252 may not move at all relative to the second upper tube 210 (due to static friction). After the compressive force is removed, the first and second springs 414, 416 cooperate to move the first shaft 248 and the second lower tube 214 downward to the rest state (shown in FIG. 4). Therefore, the moveable piston and shaft configuration enable the air spring 244 to absorbs smaller shocks and vibrations that would otherwise be transmitted to the handlebars 114 (FIG. 1). In some examples, in the state shown in FIG. 5, the second spring 416 is fully compressed. As such, any further upward movement of the first shaft 248 also moves the piston 252 upward.

If the compressive force is large enough, the breakaway force is reached and the first shaft 248 moves (slides) the piston 252 upward in the second upper tube 210, thereby enabling the second upper and lower tubes 210, 214 to further compress. During this compressive movement, the piston 252 may remain in the state shown in FIG. 5, in which the first spring 414 is expanded and the second spring 416 is compressed. Once the compressive force is removed, the pressure differential between the first and second chambers 254, 256 acts to push the piston 252 downward to expand the second upper and lower tubes 210, 214. In some examples, at the transition between the compression movement and the rebound movement, the piston 252 may move back to the rest position as shown in FIG. 4. However, in other examples, the piston 252 may remain in the position shown in FIG. 5. In some examples, during rebound, the piston 252 also remains in the position shown in FIG. 5. Once the air spring 244 is expanded, the first and second springs 414, 416 cooperate to move the piston 252 back to the rest position (FIG. 4) relative to the first shaft 248.

Figure 6:
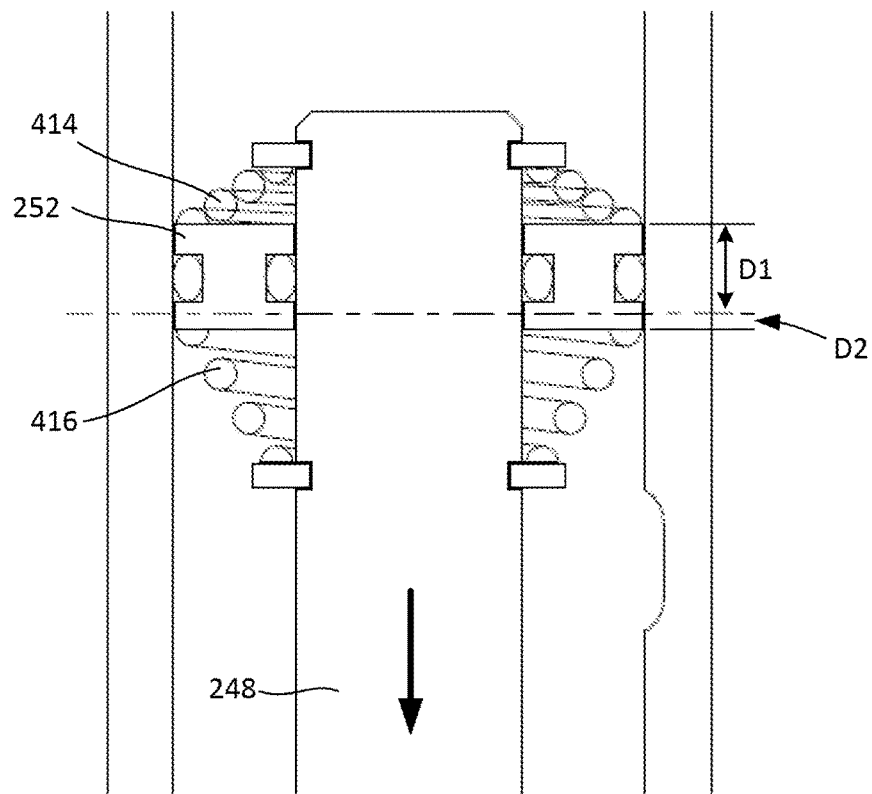
FIG. 6 shows the example shaft of FIG. 4 moved in a second direction relative to the example shaft.

In some instances, as shown in FIG. 6, the first shaft 248 can also move downward relative to the piston 252. This movement causes compresses the first spring 414 and expands the second spring 416. As such, the piston 252 is moved to a position where the distance D1 is greater than the distance D2. This can occur during compression, at the transition between compression and rebound, during rebound, and/or instances where the second upper and lower tubes 210, 214 are moved apart. This results in a momentary reduced rebound speed of the piston 252 relative to the first shaft 248, thus reducing the momentary rebound force acting on the air spring 244. Reducing momentary forces acting on the air spring 244 improves user suspension behavior, system handling, and performance. Therefore, the movable piston and shaft configuration and the first and second springs 414, 416 absorb high frequency, low amplitude vibrations that would otherwise be transmitted through the second upper and lower tubes 210, 214 to the handlebars 114 (FIG. 1). As such, the movable piston and shaft configuration and the first and second springs 414, 416 may be considered frequency sensitive. In particular, long and slow inputs are partially absorbed by the first and second springs 414, 416 and transmitted to piston 252, whereas fast and short inputs are absorbed primarily in the first and second springs 414, 416. In this manner, the movable piston and shaft configuration and the first and second springs 414, 416 reduce vibrations felt at the handlebars 114 (FIG. 1). As such, small compressive forces from bumps can be absorbed by the air spring 244. The example configuration improves suspension behavior, system handling, and performance.

In some examples, the first and second springs 441, 416 are configured to maintain contact with the piston 252 and the retainers 418, 420 (and, thus, the first shaft 248) at all times. This ensures a smooth, stabilized movement between the first shaft 248 and, thus, between the second upper and lower tubes 210, 214.

In some examples, the first shaft 248 and the piston 252 are movable about 4 mm in one direction relative to each other (and, thus, allows about 8 mm of travel between the second upper and lower tubes 210, 214). In other examples, depending on the magnitude of the force, the spring constants of the springs 414, 416, and/or the breakaway force of the air spring 244 and the damper 246, the relative movement may be larger or smaller. For instance, in other examples, the range of movement may be about 10 mm. In some examples, having springs on both sides of the piston 252 is advantageous because the net force to initiate movement in either direction is zero (or within an infinitesimal tolerance of zero). Therefore, unlike known front forks, the example front fork 108 does not require a certain force to overcome some friction or breakaway force to initiate movement. Instead, any net compressive or expansive force can result in relative movement of the second upper and lower tubes 210, 214. This results in less vibrations or shocks transmitted through the front fork 108 to the handlebars 114 (FIG. 1). Further, in some examples, having the first and second springs 414, 416 on opposite sides of the piston 252 reduces any gap behind the piston 252 that could cause an impact upon release of force. Therefore, in some examples, having a spring on both sides of the piston 252 results in a more stable and smooth movement. However, in other examples, only one spring can be implemented, which is still advantageous for achieving the results disclosed herein. Additionally, using only one spring can also be used to achieve certain movements in one direction. For example, using one spring can be used so that the piston or damper member only moves under a compression movement and/or is biased for more compression movement than rebound movement.

The first and second springs 414, 416 also absorb high frequency, low amplitude vibrations that may otherwise not be absorbed by the front fork 108. For example, if riding over a washboard terrain, the first and second springs 414, 416 enable the second lower tube 214 to flutter relative to the second upper tube 210. As such, these high frequency, lower amplitude vibrations are not transmitted to the handlebars 114 (FIG. 1). In some examples, having the moveable piston and shaft configuration within the second upper tube 210 helps protect these moving components from dirt or debris.

While in the illustrated example the air spring 244 includes the first and second springs 414, 416, in other examples, the air spring 244 may only include one of the springs. For example, only the second spring 416 can be included. In such an example, the second spring 416 still enables the first shaft 248 and the piston 252 to move relative to each other to help absorb vibrations. In such an example, the second spring 416 may be coupled to the piston 252 and/or the air spring 244 may include a stop (e.g., near the end of the first shaft 248) to prevent the piston 252 from moving beyond the first shaft 248. An example of a single-spring configuration is shown in connection with the damper 246 in FIGS. 15-18 and may be similarly implemented in connection with the air spring 244. Further, while in this example the cushioning members are implemented as springs, in other examples, the cushioning members can be implemented as other components, such as one or more elastomeric members (e.g., nitrile rubber).

Figure 7:
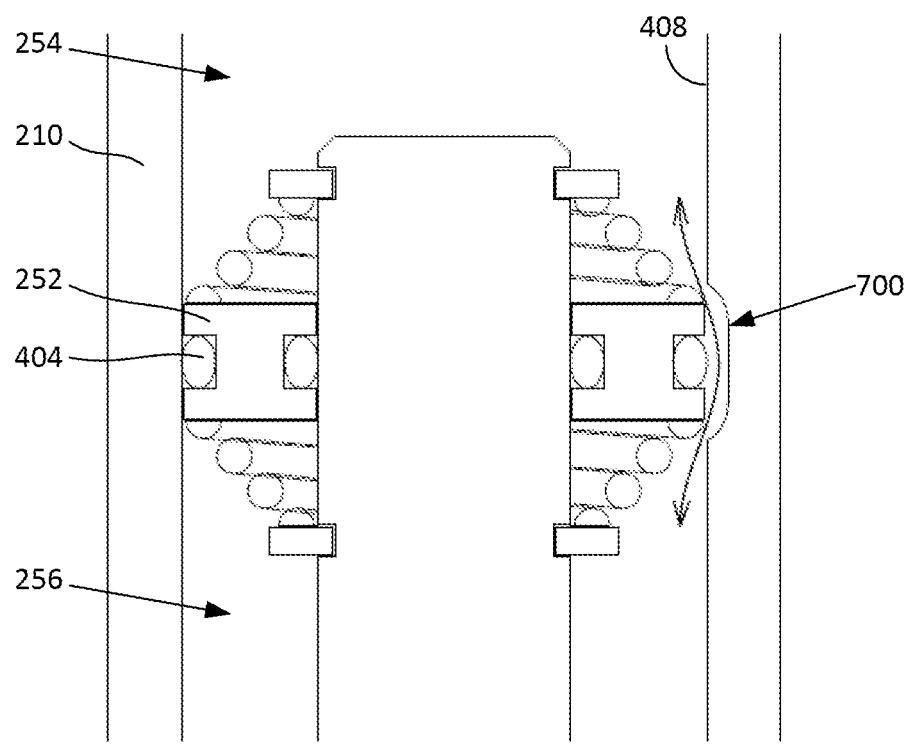
FIG. 7 shows an example air bypass feature that can be implemented in the example air spring of FIG. 3.

In some examples the air spring 244 can include an air bypass feature to enable air (or other fluid in the air spring 244) in the first and second chambers 254, 256 to equalize during and/or after a compression/rebound stroke. For example, as shown in FIG. 7, the inner surface 408 of the second upper tube 210 has an indentation 700 (e.g., a recess, a groove, etc.) to enable air to bypass the piston 252 during compression or rebound. In particular, when the piston 252 passes the indentation 700 (during compression or rebound), air in the first and/or second chambers 254, 256 can bypass the piston 252 (and the outer seal 404), thereby equalizing the pressure in the first chamber 254 (the positive air chamber) and the second chamber 256 (the negative air chamber). The bypass function is position sensitive relative to top-out. In particular, the bypass feature (e.g., indention 700) can be disposed a certain distance (e.g., 20 mm) from a top-out position of the piston 252 to achieve desired effects. For instance, during a rebound cycle, the piston 252 reaches the bypass feature and equalizes the pressure, and then continues toward the full top-out position deactivating the bypass and slightly compressing the air in the second chamber 256 (the negative air chamber). Therefore, the compressed air in the second chamber 256 balances against the initial breakaway force of the inherit pressure in the first chamber 254 (the positive air chamber). However, in other examples, the air spring 244 may not include such an air bypass feature. In other examples, the air spring 244 may have sufficient compliance and may not include a negative air chamber (the second chamber 256). In some such examples, the air spring 244 can include a ramp to soften the inherent positive spring platform. In some examples, the second chamber 256 can be replaced with a physical spring, such as a coil spring or an elastomeric member.

Figures 8, 9:
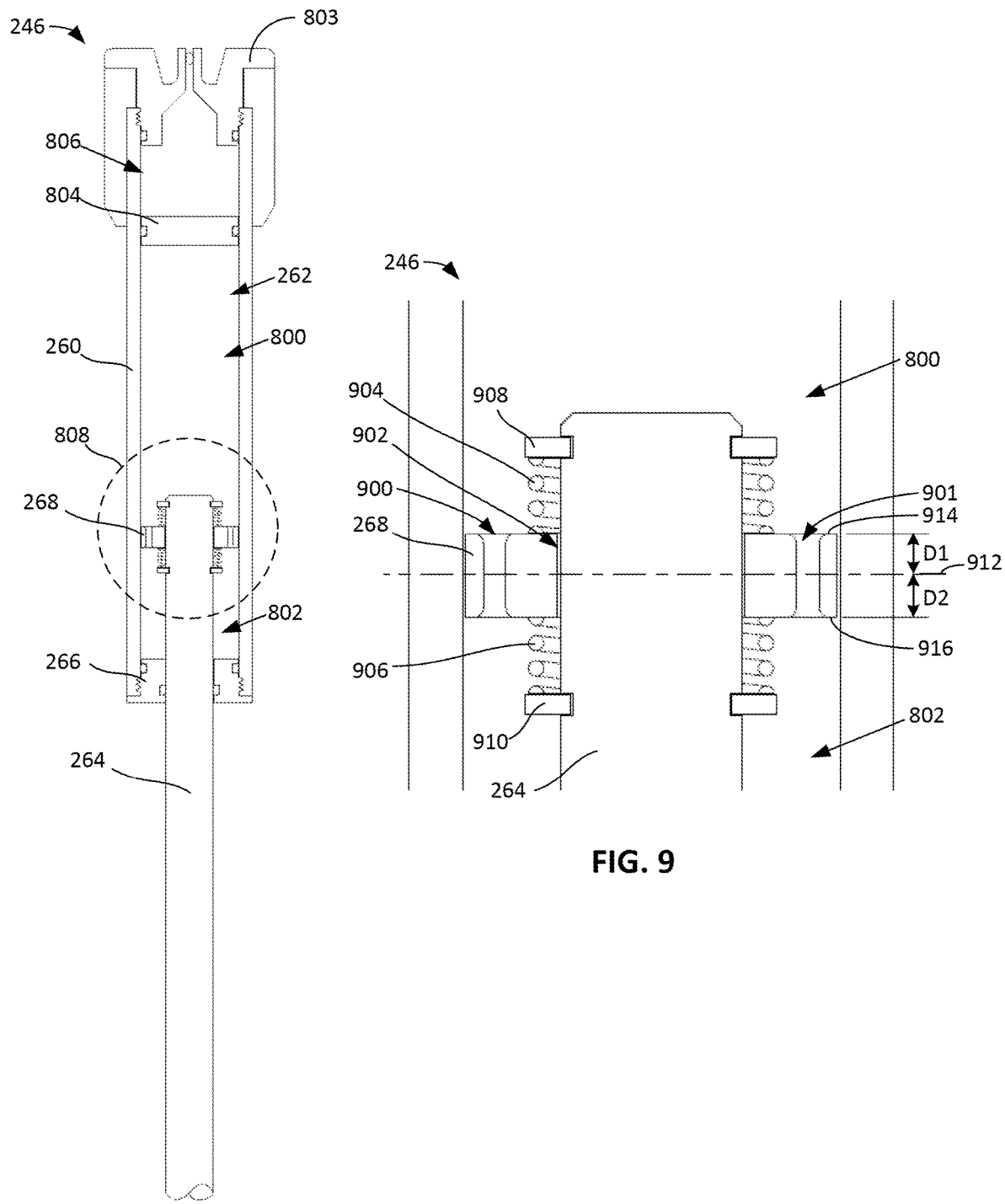
FIG. 8 is a cross-sectional view of an example damper that can be implemented in the example front fork of FIG. 2 on the example bicycle.
FIG. 9 is an enlarged view of the callout in FIG. 8 showing an example damper member movably coupled to an example shaft by a dual-spring configuration.

The example moveable piston and spring configuration disclosed in connection with the air spring 244 in FIGS. 3-6 can be similarly implemented in connection with the damper 246. FIG. 8 is a cross-sectional view of the example damper 246 in an extended or unloaded state. The second shaft 264 extends through the seal 266 and into the damper body 260. The damper member 268 is coupled to the second shaft 264 and disposed in the chamber 262 of the damper body 260. The damper member 268 is slidable in the damper body 260.

As shown in FIG. 8, the damper member 268 divides the chamber 262 into a first chamber 800 and a second chamber 802. The first and second chambers 800, 802 are filled with fluid. When the front fork 108 (FIG. 2) compresses and the ends of the first upper and lower tubes 208, 212 (FIG. 2) move toward each other, such as when riding over a bump, the second shaft 264 moves the damper member 268 upward in the chamber 262 toward a top end 803 of the damper body 260. During rebound, the damper member 268 moves downward in the chamber 262 away from the top end 803 of the first upper tube 208.

In some examples, as shown in FIG. 8, the damper 246 includes an internal floating piston (IFP) 804 in the chamber 262 that can slide upward or downward to change the volume of an accumulation chamber 806. In some examples, a user (e.g., a rider) can interact with the accumulation chamber 806 (e.g., via a control knob) to change the resistance of the IFP 804 and, thus, affect compression damping rate.

FIG. 9 is an enlarged view of the callout 808 of FIG. 8. As shown in FIG. 9, the damper member 268 has one or more channels or fluid flow paths extending through the damper member 268 to enable fluid to flow across the damper member 268 between the first and second chambers 800, 802. In the illustrated example, first and second channels 900, 901 are shown. In other examples, the damper member 268 may include more or fewer channels. When the front fork 108 (FIG. 2) is compressed, for example, the fluid is pushed across the damper member 268 and flows from the first chamber 800 to the second chamber 802. Conversely, when the front fork 108 rebounds or expands (e.g., via return force from the air spring 244), the fluid is pushed across the damper member 268 and flows from the second chamber 802 to the first chamber 800. The damper member 268 limits the rate of fluid flow between the first and second chambers 800, 802, which dampens movement of the front fork 108 and thereby affects the speed at which the front fork 108 compresses and/or rebounds.

The damper member 268 is moveably coupled to the second shaft 264. This allows the second shaft 264 and the damper member 268 to move relative to each other, which enables the first upper and lower tubes 208, 212 to move (compress or rebound) relative to each other. In the illustrated example, the second shaft 264 extends through the damper member 268. In particular, the damper member 268 has an opening 902 through which the second shaft 264 extends. The damper member 268 is slidable along the second shaft 264, and the second shaft 264 is slidable through the damper member 268. Therefore, the second shaft 264 and the damper member 268 can slide axially relative to each other. In this manner, the second shaft 264 and the damper member 268 are movably coupled. In other examples the second shaft 264 and the damper member 268 can be movably coupled in other configurations or arrangements. For example, the damper member 268 may be disposed above or beyond the second shaft 264 and may be coupled to the second shaft 264 by a spring.

The damper 246 can include one or more cushioning members to control relative movement of the second shaft 264 and the damper member 268. In some examples, the cushioning members are implemented as springs. In this example, the damper 246 includes a dual-spring configuration. For example, as illustrated in FIG. 9, the damper 246 includes a first spring 904 disposed above the damper member 268 and a second spring 906 disposed below the damper member 268. Therefore, the second spring 906 is disposed on an opposite side of the damper member 268 as the first spring 904. The first spring 904 biases the damper member 268 in a first direction relative to the second shaft 264, and the second spring 906 biases the damper member 268 in a second direction opposite the first direction relative to the second shaft 264. Said another way, the first spring 904 biases the second shaft 264 in a first direction relative to the damper member 268, and the second spring 906 biases the second shaft 264 in a second direction opposite the first direction relative to the damper member 268.

In the illustrated example, the damper 246 includes a first retainer 908 coupled to the second shaft 264 and a second retainer 910 coupled to the second shaft 264. The first spring 904 is disposed (e.g., axially constrained) between the first retainer 908 and the damper member 268, and the second spring 416 is disposed (e.g., axially constrained) between the second retainer 910 and the damper member 268. In some examples, the first and second retainers 908, 910 are circlips. In some examples, the first spring 904 is fixedly coupled or attached to the first retainer 908 and/or the damper member 268 (e.g., via welding, via fasteners, etc.). In other examples, the first spring 904 is not fixedly attached to the first retainer 908 or the damper member 268, but merely compressed or sandwiched between the two parts. The second spring 906 can be similarly arranged between the second retainer 910 and the damper member 268. In the illustrated example, the first and second springs 904, 906 are disposed around (e.g., are concentric or coaxial with) the second shaft 264. However, in other examples, the first and/or second springs 940, 906 can be disposed in other locations.

In some example, the first and second springs 904, 906 are compression springs. As such, the first spring 904 biases the damper member 268 downward relative to the second shaft 264, and the second spring 906 biases the damper member 268 upward relative to the second shaft 264. In this example, the first and second springs 904, 906 are cylindrical coil springs. In some examples, it is advantageous to use cylindrical coil springs so as to reduce interference with fluid flow across the damper member 268. In other examples, the first and second springs 904, 906 can be implemented as other types of springs (e.g., conical coil springs). Further, in other examples, the first and second springs 904, 906 can be implemented as tension springs.

In this example, the springs 904, 906 provide substantially the same biasing force. As such, in a rest state, the damper member 268 is substantially centered between the first and second retainers 908, 910, as shown in FIG. 9. For example, a center line 912 is labeled in FIG. 9, which represents the center between the first and second retainers 908, 910. In this example, the damper member 268 is centered along the center line 912 in the rest state or position. In particular, a distance D1 between a top (first) side 914 of the damper member 268 and the center line 912 is the same as a distance D2 between a bottom (second) side 916 of the damper member 268 and the center line 912. In other examples, the springs 904, 906 can be configured (e.g., by changing the length of the springs 904, 906 and/or the spring constants) such that the damper member 268 is offset from the center line 912 in the rest state. In some examples, when the damper member 268 is in the rest position, the first and/or second springs 940, 906 are in a compressed state. In other examples, the first and/or second springs 904, 906 may be in a relaxed state.

Similar to the air spring 244 disclosed above, the movable damper member and shaft configuration and the springs 904, 906 enable relative movement between the first upper tube 208, which is attached to the frame 102, and the first lower tube 212, which is attached to the front wheel 104. Therefore, the damper member 268, the second shaft 264, and the springs 904, 906 control the movement of the first upper and lower tubes 208, 212 along the first translation axis 230 (FIG. 2).

Figure 10:
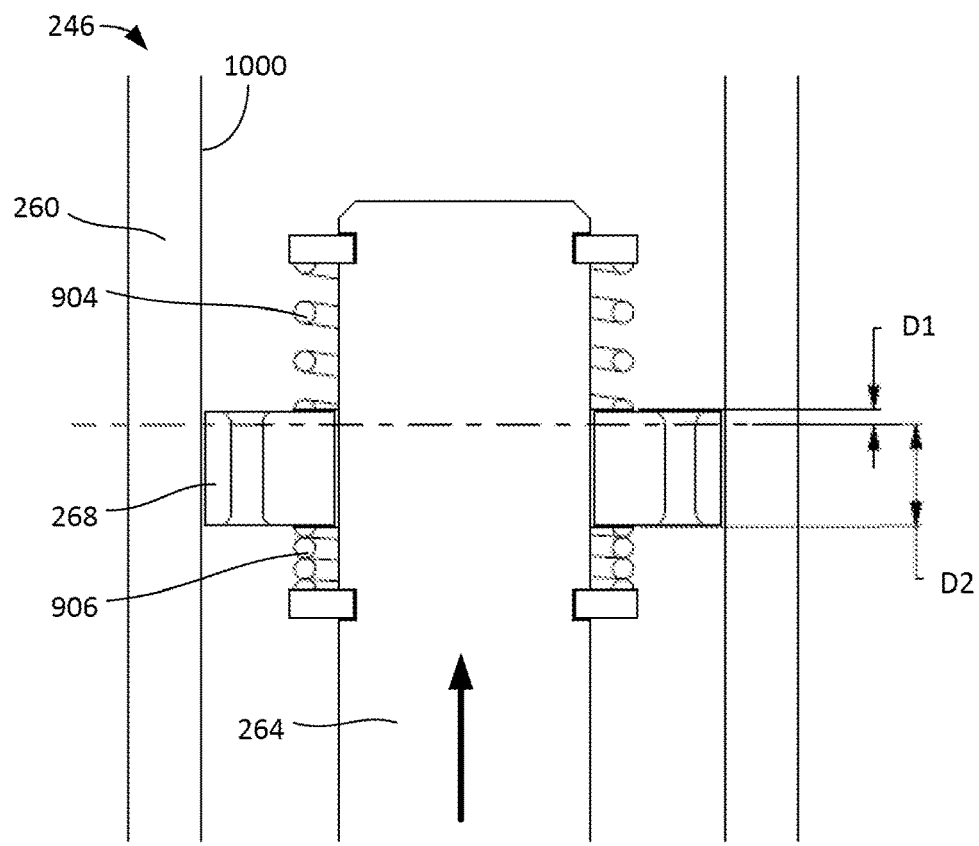
FIG. 10 shows the example shaft of FIG. 8 moved in a first direction relative to the example damper member.

FIG. 10 shows the second shaft 264 being moved upward (e.g., a first direction) relative to the damper member 268. This may occur when the damper 246 experiences a compressive force, such as when riding over a bump. For example, when a compressive force is first applied to the front fork 108, the first lower tube 212 (FIG. 2) and the second shaft 264 are forced upward (as indicated by the arrow) relative to the first upper tube 208 (FIG. 2) and the damper body 260. A certain amount of friction exists between the damper member 268 and the damper body 260 (at the interface between the damper member 268 and an inner surface 1000 of the damper body 260) that holds the damper member 268 in place until breakaway (threshold) force is reached. During the initial compressive movement, the second shaft 264 slides upward through the damper member 268. This movement compresses the second spring 906 and expands the first spring 904. For example, as shown in FIG. 10, the distance D2 is greater than the distance D1. As such, the first and second springs 904, 906 enable the first lower tube 212 (the unspring mass) to move upward relative to the first upper tube 208 before the breakaway force for the damper member 268 is reached, thereby enabling the front fork 108 to absorb the vibrations more quickly during compression and improve responsiveness. Further, this results in a momentary reduced compression speed of the damper member 268 relative to the second shaft 264, thus reducing the momentary compression force acting on the damper 246. If the compressive force is relatively small, such as when riding over a small bump, the damper member 268 may not move at all relative to the damper body 260 (due to static friction). Once the compressive force is removed, the first and second springs 904, 906 cooperate to move the second shaft 264 and the first lower tube 212 downward to the rest position (shown in FIG. 9). Therefore, the damper member and shaft configuration and the first and second springs 904, 906 enable the damper 246 to absorbs smaller shocks and vibrations that would otherwise be transmitted to the handlebars 114 (FIG. 1). In some examples, in the state shown in FIG. 10, the second spring 906 is fully compressed. As such, any further upward movement of the second shaft 264 also moves the damper member 268 upward.

If the compressive force is large enough, the breakaway force is reached and shaft 264 moves (slides) the damper member 268 upward in the damper body 260, thereby enabling the first upper and lower tubes 208, 212 to further compress. During this compressive movement, the damper member 268 may remain in the state shown in FIG. 10, in which the first spring 904 is expanded and the second spring 906 is compressed. Once the compressive force is removed, the air spring 244 (FIG. 2) acts to expand the front fork 108 (including the first upper and lower tubes 208, 212). As such, the damper member 268 slides downward in the damper body 260. In some examples, at the transition between the compression movement and the rebound movement, the damper member 268 may move back to the rest position as shown in FIG. 9. However, in other examples, the damper member 268 may remain in the state shown in FIG. 10. In some examples, during rebound, the damper member 268 also remains in the state shown in FIG. 10. Once the front fork 108 is expanded, the first and second springs 904, 906 cooperate to move the damper member 268 back to the rest position relative to the second shaft 264.

Figure 11:
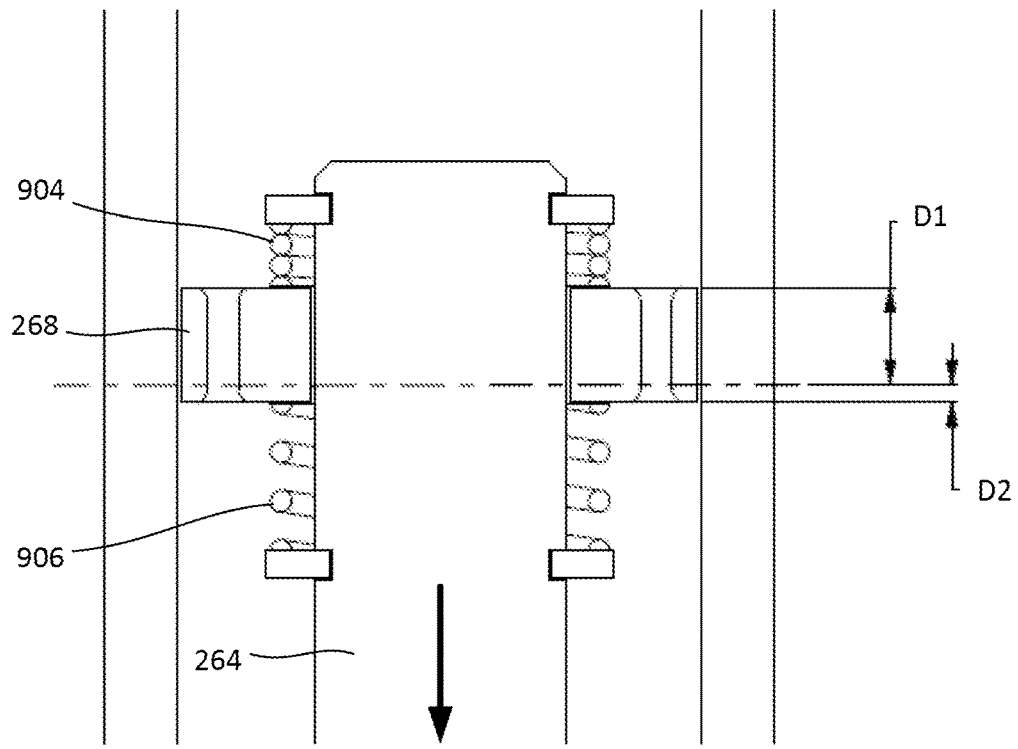
FIG. 11 shows the example shaft of FIG. 8 moved in a second direction relative to the example damper member.

In some instances, as shown in FIG. 11, the second shaft 264 can also move downward relative to the damper member 268. This movement compresses the first spring 904 and expands the second spring 906. As such, the damper member 268 is moved to a position where the distance D1 is greater than the distance D2. This can occur during compression, at the transition between compression and rebound, during rebound, and/or or instances where the first upper and lower tubes 208, 212 are moved apart. This results in a momentary reduced rebound speed of the damper member 268 relative to the second shaft 264, thus reducing the momentary rebound force acting on the damper 246. Reducing momentary forces acting on the damper 246 improves user suspension behavior, system handling, and performance.

Therefore, the movable damper member and shaft configuration and the first and second springs 904, 906 absorb high frequency, low amplitude vibrations that would otherwise be transmitted through the first upper and lower tubes 208, 212 to the handlebars 114 (FIG. 1). As such, the movable damper member and shaft configuration and the first and second springs 904, 906 are frequency sensitive. In particular, long and slow inputs are partially absorbed by the first and second springs 904, 906 and transmitted to damper member 268, whereas fast and short inputs are absorbed primarily in the first and second springs 904, 906. In this manner, the movable damper member and shaft configuration and the first and second springs 904, 906 reduce vibrations felt at the handlebars 114 (FIG. 1). As such, small compressive forces from bumps can be absorbed by the damper 246. The example configuration improves suspension behavior, system handling, and performance.

Figure 12:
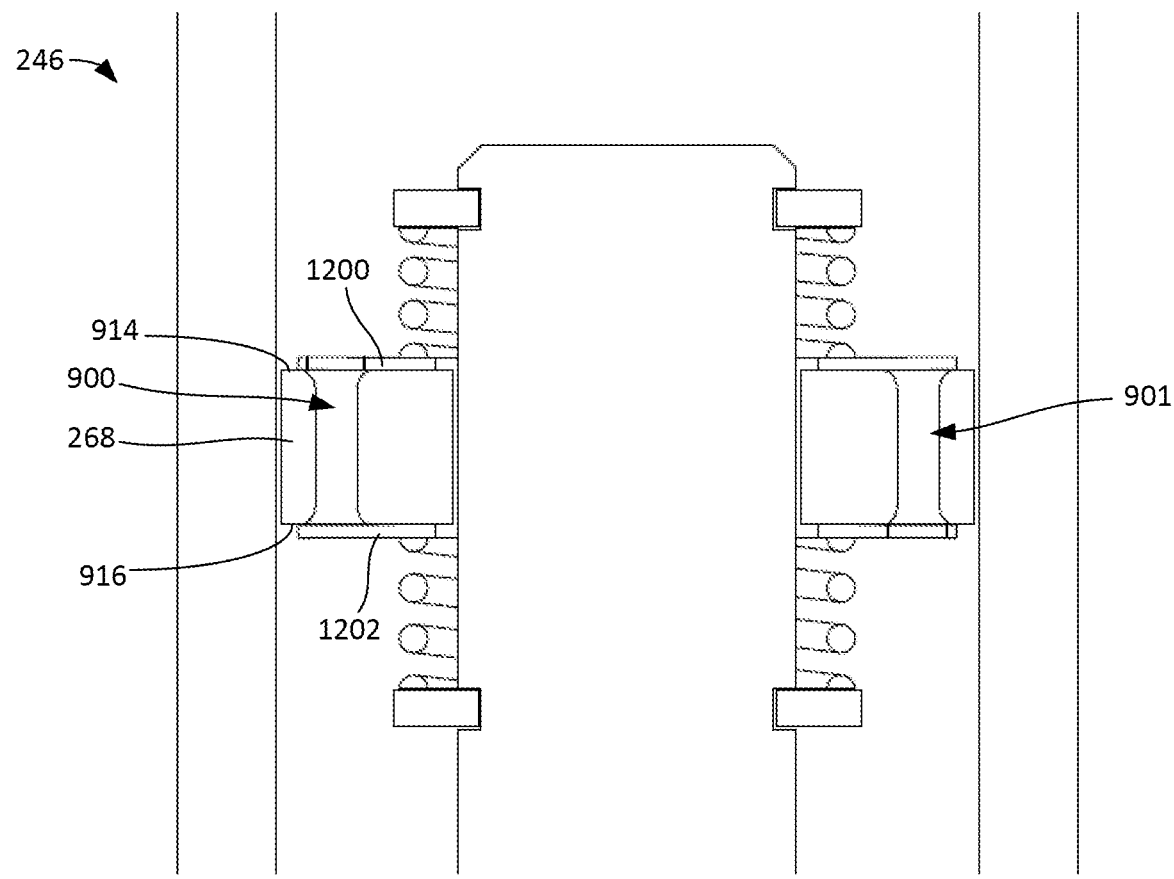
FIG. 12 shows the example damper member of FIG. 8 with example shims.

In some examples, the damper 246 can include one or more shims to increase the resistance across the damper member 268. For example, FIG. 12 shows an example in which the damper 246 includes a first shim 1200 disposed on the top side 914 of the damper member 268 and a second shim 1202 on the second side 916 of the damper member 268. The first shim 1200 covers at least one of the channels on the top side 914 of the damper member 268, and the second shim 1202 covers at least one of the channels on the bottom side 916 of the damper member 268. The second shim 1202 covers different channels than the first shim 1200. For example, the first shim 1200 covers the second channel 901 in the damper member 268 on the top side 914. However, the second shim 1202 does not cover the second channel 901 on the bottom side 916 (e.g., the second shim 1202 may be notched or have an opening aligned with the second channel 901). Conversely, the second shim 1202 covers the first channel 900 on the bottom side 916, but the first shim 1200 does not cover the first channel 900 on the top side 914. The shims 1200, 1202 may be high resistance shims or low resistance shims.

Figure 13:
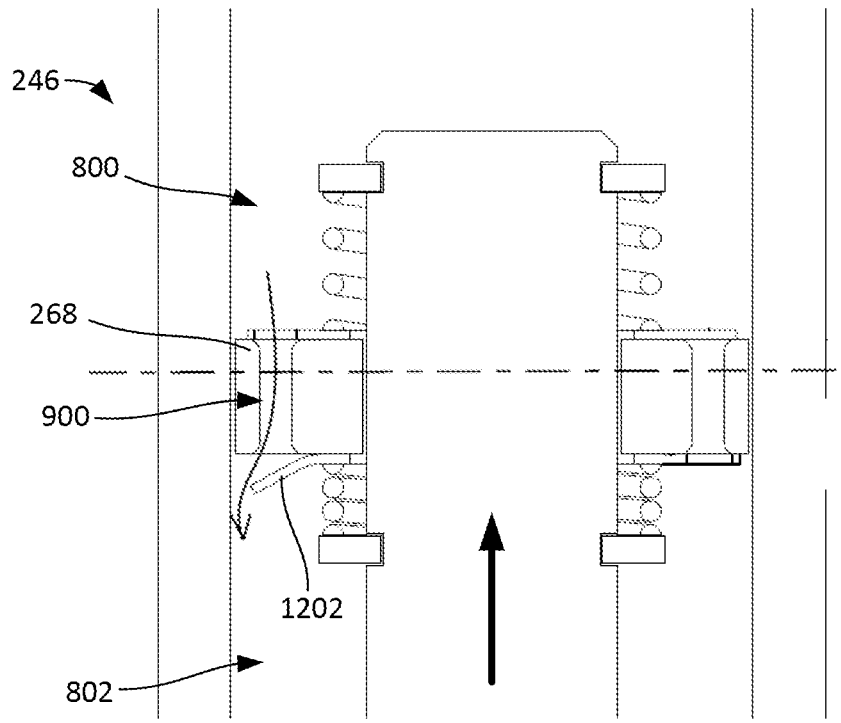
FIG. 13 shows an example flow path of fluid across the example damper member of FIG. 12 in a first direction.

FIG. 13 shows the damper 246 during compression. As the damper member 268 is moved upward in the damper body 260 (as shown by the arrow), the fluid in the first chamber 800 is forced through the first channel 900, and bends open the second shim 1202 to flow into the second chamber 802. The resistance provided by the second shim 1202 dampens or slows the movement of fluid from the first chamber 800 to the second chamber 802, thereby increasing damping during a compression movement.

Figure 14:
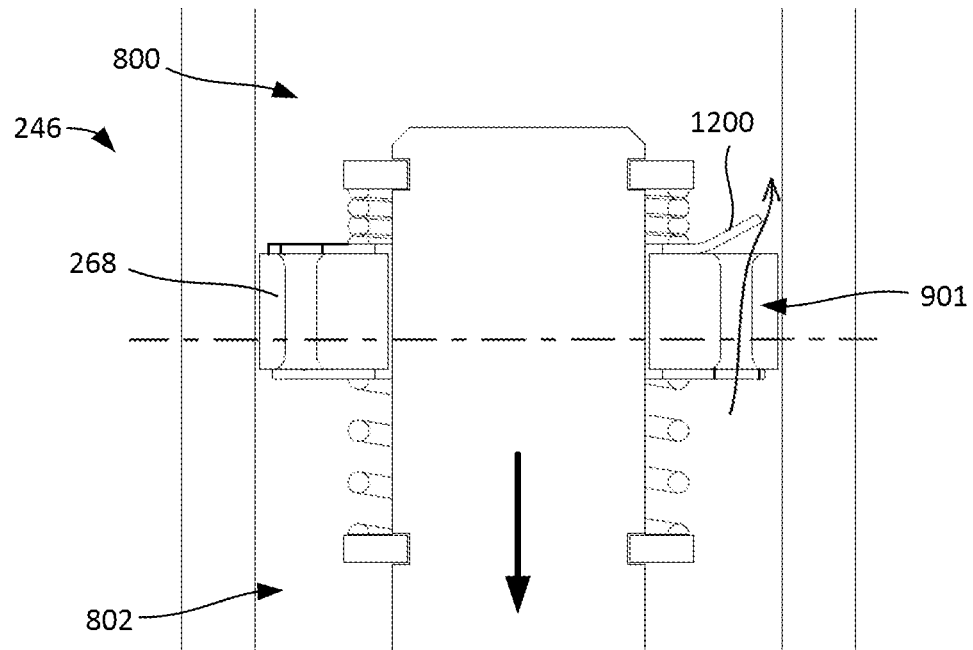
FIG. 14 shows an example flow path of fluid across the example damper member of FIG. 12 in a second direction.

FIG. 14 shows the damper 246 during rebound. As the damper member 268 is moved upward in the damper body 260, the fluid in the second chamber 802 is forced through the second channel 901, and bends open the first shim 1200 to flow into the first chamber 800. The resistance provided by first shim 1200 dampers or slows the movement of fluid from the second chamber 802 to the first chamber 800, thereby increasing damping during a rebound movement. While in this example only one shim is disposed on each side of the damper member 268, in other examples multiple shims (e.g., a shim stack) may be disposed on the sides of the damper member 268. Additionally or alternatively, one or more shims may only be provided on one side of the damper member 268.

While in some of the examples disclosed above the air spring 244 and the damper 246 have dual-spring configurations, in other examples, the air spring 244 and/or the damper 246 may have a single-spring configuration. For example, FIG. 15 shows an example in which the damper 246 has one spring. The damper 246 shown in FIG. 15 is substantially the same as the damper 246 shown in FIG. 8. Therefore, any of the example structural and/or functional features disclosed in connection with FIGS. 8-14 can likewise apply to the example damper 246 shown in FIG. 15. However, in FIG. 15, the example damper 246 includes a single-spring configuration.

FIG. 16 is an enlarged view of the callout 1500 from FIG. 15. As shown in FIG. 16, the damper 246 includes a spring 1600. In this example, the spring 1600 is disposed below the damper member 268. In the illustrated example, the second shaft 264 has a flange 1602 that extends radially outward form the second shaft 264. The spring 1600 is disposed (e.g., axially constrained) between the flange 1602 and the damper member 268. In some examples, the spring 1600 is fixedly coupled or attached to the flange 1602 and/or the damper member 268. (e.g., via welding, via fasteners, etc.). For example, as shown in FIG. 16, a bottom coil of the spring 1600 is held between the flange 1062 and a first ridge 1604 that extends radially outward from the second shaft 264. Similarly, a top coil of the spring 1600 is held between the damper member 268 and a second ridge 1606 that extends radially outward from the bottom side 916 of the damper member 268. In other examples, the spring 1600 can be attached or coupled to the flange 1602 and/or the damper member 268 via other techniques (e.g., circlips, welding, fasteners, etc.). In other examples, the spring 1600 is not fixedly attached to the flange 1602 or the damper member 268, but merely compressed or sandwiched between the two parts.

In this example, the spring 1600 is a compression spring. As such, when the spring 1600 is compressed, the spring 1600 biases the damper member 268 upward relative to the second shaft 264. However, if the damper member 268 is moved upward, the spring 1600 may be moved into tension, and can bias the damper member 268 downward relative to the second shaft 264. In this example, the spring 1600 is a cylindrical coil spring. In other examples, the spring 1600 can be implemented as another types of springs (e.g., a conical coil spring). Further, in other examples, the spring 1600 can be implemented as a tension spring.

FIG. 16 shows the damper member 268 in a rest state or position, centered along the center line 912. In this rest state or position, the spring 1600 may be in a neutral state in which the spring 1600 is not under compression or tension. Similar to the springs 904, 906 disclosed above, the spring 1600 enables relative movement between the first upper tube 208, which is attached to the frame 102, and the first lower tube 212, which is attached to the front wheel 104. Therefore, the spring 1600 controls the movement of the first upper and lower tubes 208, 212 along the first translation axis 230.

Figure 17:
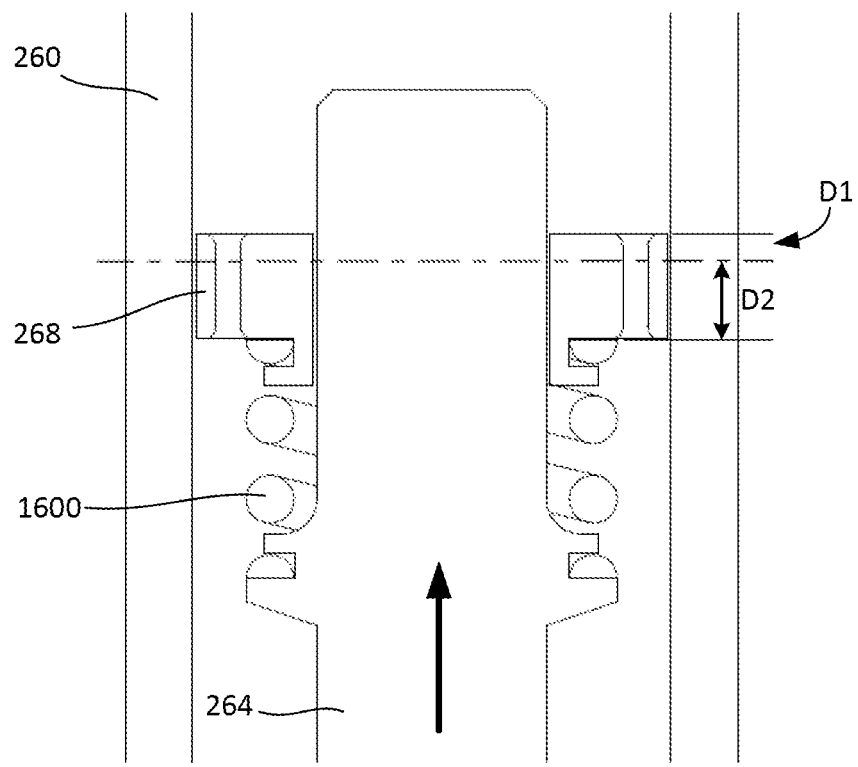
FIG. 17 shows the example shaft of FIG. 16 moved in a first direction relative to the example damper member.

FIG. 17 shows the second shaft 264 being moved upward relative to the damper member 268. This may occur when the damper 246 experiences a compressive force. For example, during a compression movement, the first lower tube 212 (FIG. 2) and the second shaft 264 are force upward (as indicated by the arrow) relative to the first upper tube 208 (FIG. 2) and the damper body 260. During the initial compressive movement, the second shaft 264 slides upward through the damper member 268. This movement compresses the spring 1600. For example, as shown in FIG. 17, the distance D2 is greater than the distance D1. As such, the spring 1600 enables the first lower tube 212 (the unspring mass) to move upward relative to the first upper tube 208 before the breakaway force for the damper member 268 is reached, thereby enabling the front fork 108 to absorb the vibrations more quickly during compression and improve responsiveness. If the compressive force is relatively small, such as when riding over a small bump, the damper member 268 may not move at all relative to the damper body 260 (due to static friction). Once the compressive force is removed, the spring 1600 biases the second shaft 264 and the first lower tube 212 downward to the rest position (shown in FIG. 16). Therefore, the spring 1600 enables the damper 246 to absorb smaller shocks and vibrations that would otherwise be transmitted to the handlebars 114 (FIG. 1). In some examples, in the state shown in FIG. 10, the second spring 906 is fully compressed. As such, any further upward movement of the second shaft 264 also moves the damper member 268 upward.

If the compressive force is large enough, the breakaway force is reached and shaft 264 moves (slides) the damper member 268 upward in the damper body 260, thereby enabling the first upper and lower tubes 208, 212 to further compress. During this compressive movement, the damper member 268 may remain in the state shown in FIG. 17, in which the spring 1600 is compressed. Once the compressive force is removed, the air spring 244 (FIG. 2) acts to expand the front fork 108 (including the first upper and lower tubes 208, 212). As such, the damper member 268 slides downward in the damper body 260. In some examples, at the transition between the compression movement and the rebound movement, the damper member 268 may move back to the rest position as shown in FIG. 16. However, in other examples, the damper member 268 may remain in the state shown in FIG. 17. In some examples, during rebound, the damper member 268 also remains in the state shown in FIG. 17. Once the fork 108 is expanded, the spring 1600 moves the damper member 268 back to the rest position relative to the second shaft 264.

Figure 18:
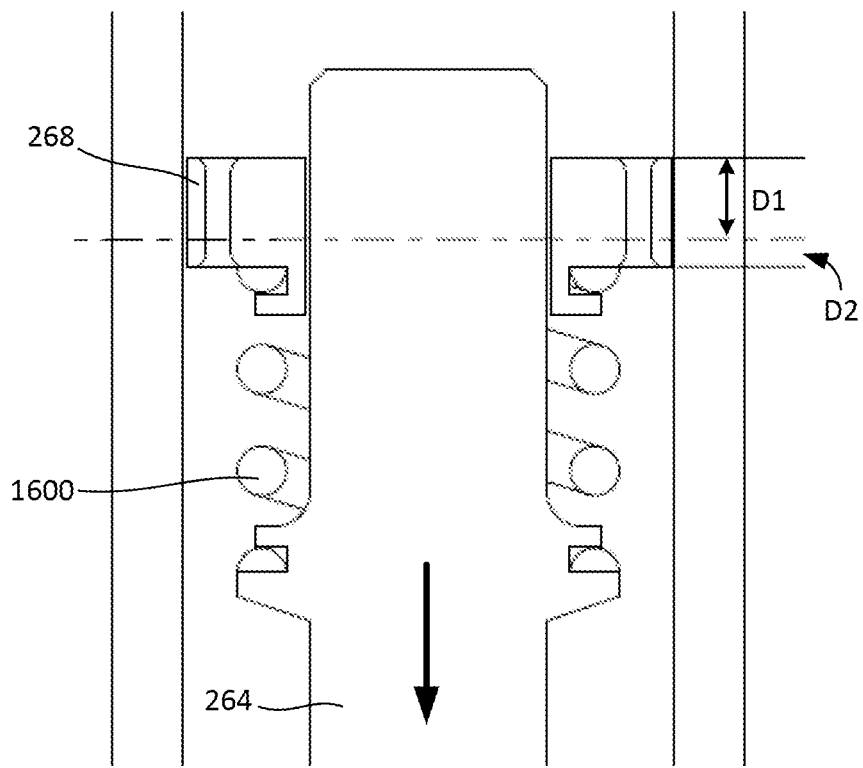
FIG. 18 shows the example shaft of FIG. 16 moved in a second direction relative to the example damper member.

In some instances, the second shaft 264 can also move downward relative to the damper member 268, as shown in FIG. 18. This movement expands the spring 1600 (e.g., such that the spring 1600 is in tension). As such, the damper member 268 is moved to a position where the distance D1 is greater than the distance D2. This can occur during compression, at the transition between compression and rebound, during rebound, and/or or instances where the first upper and lower tubes 208, 212 are moved apart. While in this example the spring 1600 is disposed below the damper member 268, in other examples, the spring 1600 can be disposed above the damper member 268 (e.g., between the damper member 268 and a flange at or near the end of the second shaft 264).

In some examples, both the air spring 244 and the damper 246 include moveable piston/damper member and shaft configurations. However, in other examples, only one of the air spring 244 and the damper 246 may include a moveable piston/damper member and shaft configuration. While the example moveable piston/damper member and shaft configurations of FIGS. 3-18 are described in connection with a front fork suspension component, the example moveable piston/damper member and shaft configurations can be similarly implemented in connection with other types of suspension components for the front wheel 104 (FIG. 1) and/or for other components on a vehicle. For example, any of the example moveable piston/damper member and shaft configurations can be implemented in connection with a single-legged fork, which may include an integrated damper and spring system in the same leg. As another example, any of the example moveable piston/damper member and shaft configurations can be implemented in the rear shock absorber 136 (FIG. 1). As another example, any of the example moveable piston/damper member and shaft configurations can be implemented in connection with a suspension component used in connection with another component on the bicycle 100 (FIG. 1), such as the seat post 112 (FIG. 1).

Example suspension components for bicycles have been disclosed herein. The following paragraphs provide various examples and example combinations of the examples disclosed herein.

Example 1 is a suspension component for a bicycle. The suspension component includes an air spring including, an air spring body and a piston in the air spring body. The piston divides the air spring body into a first chamber and a second chamber. The air spring includes a shaft extending into the air spring body. The shaft extends through the piston. The piston is slidable along the shaft. The air spring also includes a spring to bias the piston in a first direction relative to the shaft.

Example 2 includes the suspension component of Example 1, wherein the spring is disposed around the shaft.

Example 3 includes the suspension component of Examples 1 or 2, wherein the spring is a coil spring.

Example 4 includes the suspension component of any of Examples 1-3, further including a retainer coupled to the shaft. The spring is axially constrained between the retainer and the piston.

Example 5 includes the suspension component of any of Examples 1-4, wherein the spring is a first spring. The suspension component further includes a second spring disposed on an opposite side of the piston as the first spring. The second spring is to bias the piston in a second direction relative to the shaft.

Example 6 includes the suspension component of Example 5, further including a first retainer coupled to the shaft and a second retainer coupled to the shaft. The first spring is axially constrained between the first retainer and the piston, the second spring is axially constrained between the second retainer and the piston.

Example 7 includes the suspension component of Example 6, wherein the first and second retainers are circlips.

Example 8 includes the suspension component of any of Examples 1-7, wherein the air spring includes an inner seal disposed in a seal gland formed in an inner peripheral edge of the piston. The inner seal is to seal between the piston and the shaft.

Example 9 includes the suspension component of any of Examples 1-8, wherein an inner surface of the air spring body includes an indentation to enable air to bypass the piston during compression or rebound.

Example 10 includes the suspension component of any of Examples 1-9, wherein the air spring body is a first tube. The suspension component further includes a second tube configured in a telescopic arrangement with the first tube. The shaft is coupled to a bottom end of the second tube. The second tube includes a wheel attachment portion.

Example 11 is a suspension component for a bicycle. The suspension component includes a damper including a damper body and a damper member in the damper body. The damper member divides the damper body into a first chamber and a second chamber. The damper includes a shaft extending into the damper body. The shaft extends through the damper member. The damper member is slidable along the shaft. The damper also includes a spring to bias the damper member in a first direction relative to the shaft.

Example 12 includes the suspension component of Example 11, wherein the spring is disposed around the shaft.

Example 13 includes the suspension component of Examples 11 or 12, further including a retainer coupled to the shaft. The spring is axially constrained between the damper member and the retainer.

Example 14 includes the suspension component of any of Examples 11-13, wherein the spring is a first spring. The suspension component further includes a second spring disposed on an opposite side of the damper member as the first spring. The second spring is to bias the damper member in a second direction relative to the shaft.

Example 15 includes the suspension component of Example 14, further including a first retainer coupled to the shaft and a second retainer coupled to the shaft. The first spring is axially constrained between the first retainer and the damper member, and the second spring is axially constrained between the second retainer and the damper member.

Example 16 includes the suspension component of any of Examples 11-15, wherein a flange extends radially outward from the shaft, and wherein the spring is axially constrained between the flange and the damper member.

Example 17 includes the suspension component of any of Examples 11-16, wherein the damper member has channels extending through the damper member to enable fluid to flow across the damper member between the first and second chambers.

Example 18 includes the suspension component of Example 17, further including: a first shim covering at least one of the channels on a first side of the damper member; and a second shim covering at least one of the channels on a second side of the damper member.

Example 19 includes the suspension component of Example 11, further including a first tube and a second tube configured in a telescopic arrangement and defining an interior space. The damper is disposed in the interior space. The shaft is coupled to a bottom end of the second tube. The second tube includes a wheel attachment portion.

Example 20 is a suspension component for a bicycle. The suspension component includes a first upper tube and a first lower tube configured in a telescopic arrangement, a second upper tube and a second lower tube configured in a telescopic arrangement, the first upper tube coupled to the second upper tube, and a damper in an interior space defined by the first upper and lower tubes. The damper includes a first shaft coupled to the first lower tube and a damper member movably coupled to the first shaft. The suspension component also includes an air spring in an interior space defined by the second upper and lower tubes. The air spring includes a second shaft coupled to the second lower tube and a piston movably coupled to the second shaft.

Example 21 includes the suspension component of Example 20, wherein the damper includes a first spring to bias the first shaft in a first direction relative to the damper member and a second spring to bias the first shaft in a second direction opposite the first direction relative to the damper member.

Example 22 includes the suspension component of Examples 20 or 21, wherein the air spring includes a third spring to bias the second shaft in the first direction relative to the piston and a fourth spring to bias the second shaft in the second direction relative to the piston.

From the foregoing, it will be appreciated that example apparatus have been disclosed that improve shock absorption in suspension components. The example moveable piston and shaft configurations disclosed herein enable relative movement between the tubes of a suspension component before the breakaway force is reached. The example moveable piston and shaft configurations disclosed herein also absorb high frequency vibrations and, thus, reduce vibrations that are felt at the handlebars of the bicycle. This creates a more comfortable ride for the rider and improves rider confidence.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A suspension component for a bicycle, the suspension component comprising:
   an air spring including:
      an air spring body;
      a piston in the air spring body, the piston dividing the air spring body into a first chamber and a second chamber, the piston including a seal;
      a shaft extending into the air spring body, the shaft extending through the piston, the piston slidable along the shaft; and
      a spring to bias the piston in a first direction relative to the shaft.

2. The suspension component of claim 1, wherein the spring is disposed around the shaft.

3. The suspension component of claim 1, wherein the spring is a coil spring.

4. The suspension component of claim 1, further including a retainer coupled to the shaft, the spring axially constrained between the retainer and the piston.

5. The suspension component of claim 1, wherein the spring is a first spring, the suspension component further including a second spring disposed on an opposite side of the piston as the first spring, the second spring to bias the piston in a second direction relative to the shaft.

6. The suspension component of claim 5, further including a first retainer coupled to the shaft and a second retainer coupled to the shaft, the first spring axially constrained between the first retainer and the piston, the second spring axially constrained between the second retainer and the piston.

7. The suspension component of claim 6, wherein the first and second retainers are circlips.

8. The suspension component of claim 1, wherein the the seal an inner seal disposed in a seal gland formed in an inner peripheral edge of the piston, the inner seal to seal between the piston and the shaft.

9. The suspension component of claim 1, wherein the air spring body is a first tube, the suspension component further including a second tube configured in a telescopic arrangement with the first tube, the shaft coupled to a bottom end of the second tube, the second tube including a wheel attachment portion.

10. A suspension component for a bicycle, the supsension component comprising:
    an air spring including:
       an air spring body;
       a piston in the air spring body, the piston dividing the air spring body into a first chamber and a second chamber;
       a shaft extending into the air spring body, the shaft extending through the piston, the piston slidable along the shaft; and
       a spring to bias the piston in a first direction relative to the shaft, wherein an inner surface of the air spring body includes an indentation to enable air to bypass the piston during compression or rebound.

11. A suspension component for a bicycle, the suspension component comprising:
    a first upper tube and a first lower tube configured in a telescopic arrangement;
    a second upper tube and a second lower tube configured in a telescopic arrangement, the first upper tube coupled to the second upper tube;
    a damper in an interior space defined by the first upper and lower tubes, the damper including:
       a first shaft coupled to the first lower tube; and
       a damper member movably coupled to the first shaft; and
    an air spring in an interior space defined by the second upper and lower tubes, the air spring including:
       a second shaft coupled to the second lower tube; and
       a piston movably coupled to the second shaft.

12. The suspension component of claim 11, wherein the damper includes:
    a first spring to bias the first shaft in a first direction relative to the damper member; and
    a second spring to bias the first shaft in a second direction opposite the first direction relative to the damper member.

13. The suspension component of claim 11, wherein the air spring includes:
    a third spring to bias the second shaft in the first direction relative to the piston; and
    a fourth spring to bias the second shaft in the second direction relative to the piston.

* * * * *